United States Patent
Yen et al.

(10) Patent No.: US 10,038,530 B2
(45) Date of Patent: Jul. 31, 2018

(54) METHOD OF TRANSMITTING AND RECEIVING CSI-RS AND RELATED APPARATUSES USING THE SAME

(71) Applicant: Industrial Technology Research Institute, Hsinchu (TW)

(72) Inventors: Chia-Pang Yen, Taipei (TW); Ping-Heng Kuo, Pingtung County (TW); Li-Chung Lo, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 98 days.

(21) Appl. No.: 15/235,111

(22) Filed: Aug. 12, 2016

(65) Prior Publication Data
US 2017/0048037 A1 Feb. 16, 2017

Related U.S. Application Data

(60) Provisional application No. 62/205,002, filed on Aug. 14, 2015.

(51) Int. Cl.
*H04W 4/00* (2018.01)
*H04L 5/00* (2006.01)
*H04B 7/06* (2006.01)

(52) U.S. Cl.
CPC ......... *H04L 5/0048* (2013.01); *H04B 7/0695* (2013.01); *H04L 5/0023* (2013.01); *H04B 7/0626* (2013.01)

(58) Field of Classification Search
CPC ... H04B 7/0626; H04B 7/0695; H04L 5/0023; H04L 5/0048
See application file for complete search history.

(56) References Cited

U.S. PATENT DOCUMENTS

| 8,989,114 B2 | 3/2015 | Kim et al. |
| 9,059,878 B2 | 6/2015 | Thomas |

(Continued)

FOREIGN PATENT DOCUMENTS

| CN | 105052047 | 11/2015 |
| CN | 105432027 | 3/2016 |
| TW | 201014423 | 4/2010 |
| WO | 2014113992 | 7/2014 |
| WO | 2014117748 | 8/2014 |

OTHER PUBLICATIONS

ITRI, "Discussion of CSI reporting based on beamformed CSI-RS," R1-152943, 3GPP TSG RAN WG1 Meeting #81, May 2015, pp. 25-29.

(Continued)

*Primary Examiner* — Kan Yuen
(74) *Attorney, Agent, or Firm* — JCIPRNET

(57) ABSTRACT

The disclosure provides a method of transmitting and receiving channel state information reference signal (CSI-RS) and related apparatuses using the same method. According to one of the exemplary embodiments, the proposed method would include not limited to mapping a CSI-RS into a plurality of beams which comprises a first beam group and a second beam group, wherein each of a first plurality of beams of the first beam group is transmitted toward a different direction from each of a second plurality of beams of the second beam group; and transmitting the first beam group and the second beam group; and receiving a channel state information (CSI) which correspond to a beam of the first beam group or a beam of the second beam group.

22 Claims, 25 Drawing Sheets

(56) References Cited

U.S. PATENT DOCUMENTS

| | | | |
|---|---|---|---|
| 9,077,415 B2 | 7/2015 | Josiam et al. | |
| 2013/0182594 A1* | 7/2013 | Kim | H04W 72/042 370/252 |
| 2015/0180684 A1 | 6/2015 | Chen et al. | |
| 2015/0201346 A1* | 7/2015 | Wu | H04L 5/001 370/252 |
| 2016/0028519 A1* | 1/2016 | Wei | H04B 7/0456 375/267 |
| 2016/0065290 A1* | 3/2016 | Zhu | H04W 52/0209 370/329 |
| 2016/0345309 A1* | 11/2016 | Xiong | H04J 11/0053 |
| 2017/0041051 A1* | 2/2017 | Rahman | H04B 7/0456 |

OTHER PUBLICATIONS

"Office Action of Taiwan Counterpart Application," dated Nov. 6, 2017, p. 1-p. 9.

Yang Song et al., "CSI-RS Design for 3D MIMO in Future LTE-Advanced", 2014 IEEE International Conference on Communications(ICC), Jun. 10-14, 2014, pp. 5101-5106.

NEC, "Discussion on beamformed CSI-RS-based schemes", 3GPP TSG RAN WG1 Meeting #81 R1-152684, May 25-29, 2015, pp. 1-2.

Samsung, "Discussion on specification impacts with beamformed CSI-RS based schemes", 3GPP TSG RAN WG1 Meeting #81 R1-152887, May 25-29, 2015, pp. 1-3.

Fujitsu, "Discussion on beamformed CSI-RS-based scheme for EBF/FD-MIMO", 3GPP TSG RAN WG1 Meeting #81 R1-152655, May 25-29, 2015, pp. 1-5.

Samsung, "Discussion on CSI-RS mapping for non-precoded CSI-RS based schemes", 3GPP TSG RAN WG1 Meeting #81 R1-152893, May 25-29, 2015, pp. 1-4.

Kyocera, "Consideration on Non-precoded CSI-RS for Elevation Beamforming/FD-MIMO", 3GPP TSG RAN WG1 Meeting #81 R1-153110, May 25-29, 2015, pp. 1-3.

Ericsson, "Flexible support of antenna arrays for FD-MIMO", 3GPP TSG-RAN WG1#81 R1-153169, May 25-29, 2015, pp. 1-5.

* cited by examiner

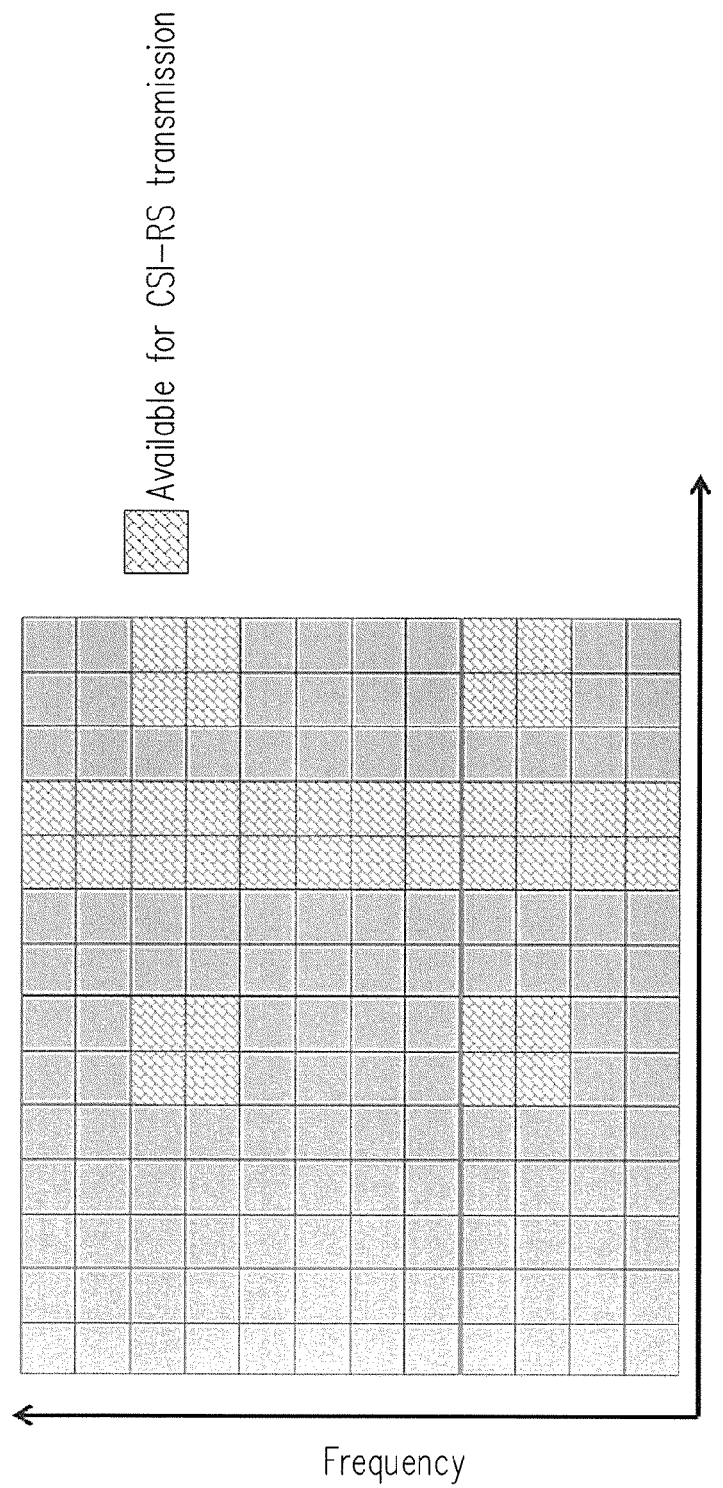

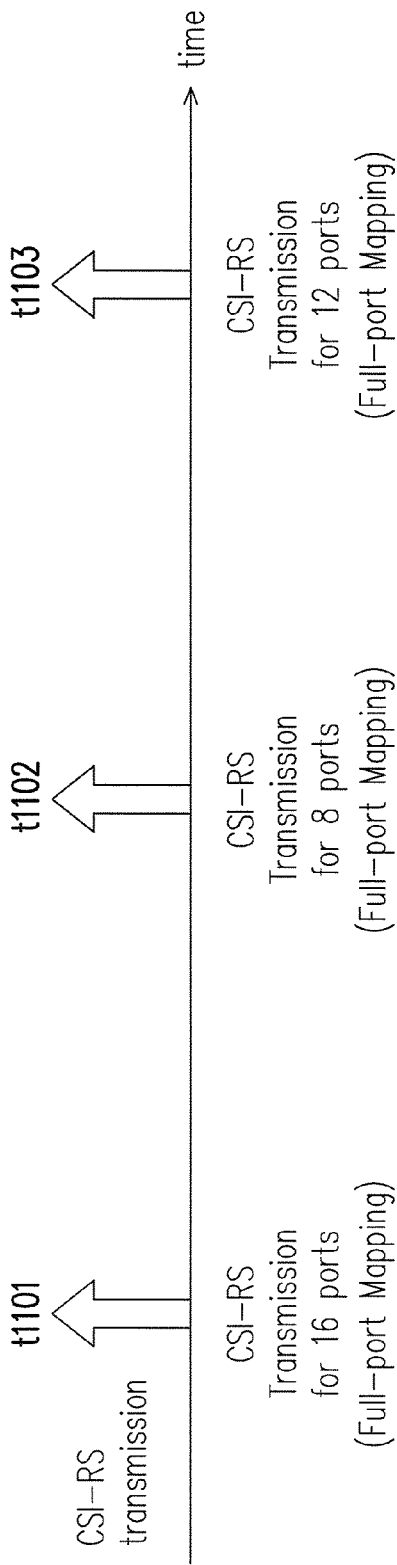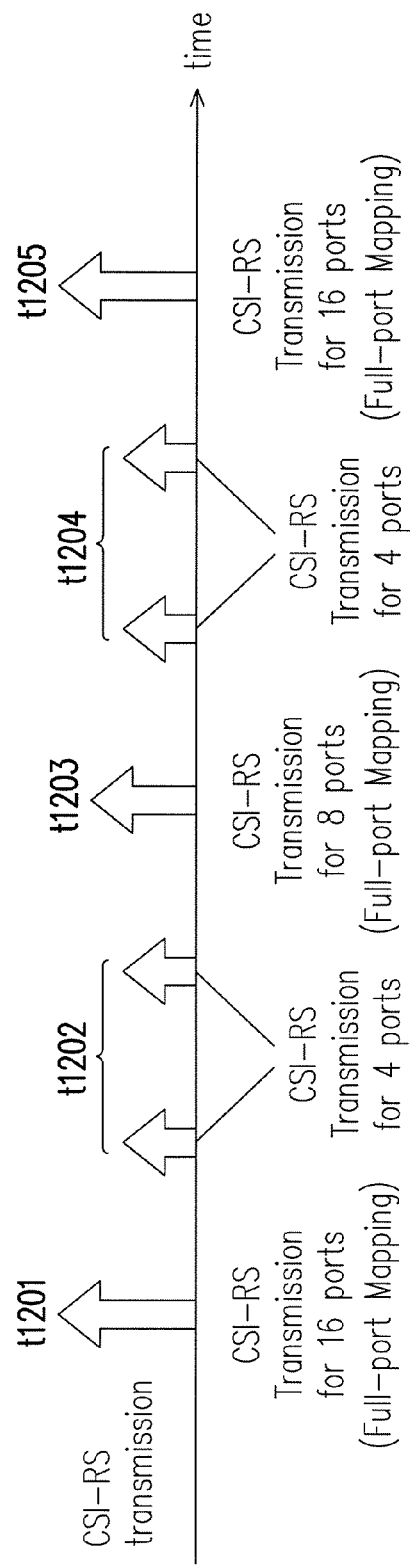

METHOD OF TRANSMITTING AND RECEIVING CSI-RS AND RELATED APPARATUSES USING THE SAME

CROSS-REFERENCE TO RELATED APPLICATION

This application claims the priority benefits of U.S. provisional application Ser. No. 62/205,002, filed on Aug. 14, 2015. The entirety of the above-mentioned patent application is hereby incorporated by reference herein and made a part of this specification.

TECHNICAL FIELD

The disclosure is directed to a method of transmitting and receiving channel state information reference signal (CSI-RS) and related apparatuses using the same method.

BACKGROUND

As the 3GPP LTE-advanced (LTE-A) communication architecture has advanced, technologies related to Elevation beamforming and Full-dimension MIMO has been discussed. In a legacy communication system, the number of antenna port could only be 8. For breamformed channel state information reference signal (CSI-RS), the number of antenna ports may remain at 8. However, for non-precoded CSI-RS, the number of antenna ports could be more than or equal to 8. As the number of antenna ports has increased, the mechanism of beamforming has been adjusted accordingly.

FIG. 1A illustrates a simple process of beamforming and describes the mapping process from physical layer to antenna port and from antenna port to transceiver units (TXRU). It is worth noting that in a 3GPP LTE-A wireless communication systems, beamforming would only be applied in the azimuth domain only. Thus, in step S101, a particular beam would be selected by selecting a specific antenna port. (i.e. 1 dimensional mapping between physical layer and antenna port in the Azimuth domain.) In step S102, the specific antenna port would be mapped to a particular channel state information reference signal (CSI-RS) by performing a one to one mapping between the particular CSI-RS and a TXRU. In the example of FIG. 1, assuming that the device that implements the beamforming utilizes an 8 antenna port codebook. The device would select an antenna port and performs mapping from a particular number of CSI-RS port to a particular number of TXRU port.

FIG. 1B illustrates a more sophisticated process of beamforming with beamforming array gains. In general, CSI-RS could be precoded before transmission to create narrow beams pointing at certain directions. The CSI-RS could be transmitted exactly as the PDSCH so that the CSI-RS would be able to benefit from array gains and have good signal to interference plus noise ratio (SINR). Thus in step S103, a single CSI-RS port could be mapping to multiple (TXRUs) by using virtualization weights to form beams. In the example of FIG. 1B, a CSI-RS port could be mapped to four different TXRU ports.

FIG. 1C illustrates an example of a process of non-precoded CSI-RS transmission. For the non-precoded mode of CSI-RS transmission, a lot more user equipment (UEs) would be able to receive a single transmission since the coverage of a single transmission is much wider in most cases. In addition, the number of logical antenna ports may also be much larger in comparison to existing MIMO schemes and thus spatial multiplexing with a high number of ranks could be allowed. And thus in step S104, the eNB may use a new codebook design by performing a 2D mapping to map from the physical layer to an antenna port containing an Elevation domain and an Azimuth domain coordinate. For the example of FIG. 1C, an eNB may select from 4 vertical ports and 8 horizontal ports to select a particular direction.

FIG. 1D illustrates a typical process of non-precoded CSI-RS transmission. In step S111, an eNB would transmit reference signals such as CSI-RS to the coverage area of the eNB. In step S112, the UE may detect the CSI-RS and perform channel estimations based on the CSI-RS. In step S113, upon calculating the CSI based on the received CSI-RS, the UE would transmit the CSI back to the eNB. In step S114, the eNB may transmit user data for the UE by precoding the user data based on the CSI. For the example of FIG. 1D, the CSI-RS of step 111 is not precoded and thus could be received by many UEs within the broadcast range of the CSI-RS.

FIG. 1E illustrates a typical process of beamformed CSI-RS transmission. In step S121, the eNB may transmit a plurality of beams with each of which containing a CSI-RS for UEs within the coverage range of the eNB. Upon receiving a particular beam containing the CSI-RS, in step S122, the UE may perform channel estimation based on the selected CSI-RS. In step S123, the UE may transmit to the eNB the CSI for the beam selected by the UE. In step S124, the UE may perform beamforming based on the received CSI of the selected beam which contains the CSI-RS. In step S125, the eNB may transmit user data for the UE by precoding the user data based on the received CSI. For the example of FIG. 1E, the CSI-RS of step S121 is precoded with an array gain and thus could be received by at least one UE with a greater SINR than the example of FIG. 1D.

Even though the CSI-RS for the example of FIG. 1E could be received with a greater SINR, it could also be not received at all. Although the current beamformed CSI-RS has antenna gain, narrow beam widths of the CSI-RS could mean that some UE would receive the CSI-RS unless the CSI-RS beams contain enough resolution to broadly cover all the UEs within a coverage range. For the example of FIG. 1F, the UE that is in between a first beam 151 and a second beam 151 would not receive the CSI-RS. Since the current LTE-A communication system has only eight antenna port for precoded CSI-RS, the eight antenna port does not normally provide sufficient resolution in the vertical dimension. This means that only some users within a cell coverage would able to receive CSI-RS successfully as some users would can be able to optimally covered by one of these narrow beams. Therefore, a more sophisticated mechanism could be proposed to optimize the system performance of a current LTE-A communication system for the precoded case.

Also for the case of nonprecoded CSI-RS, the increased of CSI-RS could be problematic for mapping between resource elements and a large quantity of CSI-RS ports. The mapping difficulties between an increased number of CSI-RS ports and resource elements is shown in FIG. 1G. For the case of non-precoded CSI-RS, the number of antenna ports could be larger than 8 and thus the CSI-RS configurations in the current LTE-A communication system may need to be enhanced to cope with cases with a larger number of antenna ports. However, it is currently unclear how the CSI-RS ports pattern could be modified to map to a number of antenna ports that is greater than 8.

Currently, there are two ways of mapping CSI-RS antenna ports to the resource elements, namely, full-port mapping and partial-port mapping. For full-port mapping, every CSI-RS port has dedicated a specific resource for its reference signal transmission, so the channel responses of all antenna ports can be measured by a user. In this way, although the entire channel matrix can be measurement by a user, the overhead required for channel measurement (e.g. CSI-RS and computational complexity of UE) can nevertheless vary greatly. For partial-port mapping, only a subset of CSI-RS ports have dedicated resource for reference signal transmission. The channel corresponding to antenna ports that are not mapped to any resource can be derived by the UE based on certain algorithms such as interpolation. Although the overhead required for channel measurement (e.g. CSI-RS resource and computation complexity of UE) can be reduced, the CSI obtained might be nevertheless less accurate.

Furthermore, the CSI-RS ports may exceed 40 different CSI-RS ports. FIG. 1H illustrates resource elements that are current available for CSI-RS transmission in a physical resource block (PRB). As shown in FIG. 1H, there are currently only 40 resource elements that are available for CS-RS transmission. How the resource elements could be expanded to accommodate a large quantity of CSI-RS ports is also unclear at this point. Therefore, based on the aforementioned shortcomings of the current LTE-A communication system, an enhanced mechanism of transmitting and receiving the CSI-RS could be very useful.

SUMMARY OF THE DISCLOSURE

Accordingly, the disclosure is directed to a method of transmitting and receiving channel state information reference signal (CSI-RS) and related apparatuses using the same method.

In one of the exemplary embodiments, the disclosure is directed to a method of transmitting a channel state information reference signal (CSI-RS) applicable to a base station. The method would include not limited to: mapping a CSI-RS into a plurality of beams which comprises a first beam group and a second beam group, wherein each of a first plurality of beams of the first beam group is transmitted toward a different direction from each of a second plurality of beams of the second beam group; transmitting the first beam group and the second beam group; and receiving a channel state information (CSI) which correspond to a beam of the first beam group or a beam of the second beam group.

In one of the exemplary embodiment, the disclosure is directed to a method of transmitting a channel state information reference signal (CSI-RS) applicable to a user equipment. The method would include not limited to: receiving a beam of a first beam group which is a part of a plurality of beams comprising a first beam group and a second beam group, wherein each of a first plurality of beams of the first beam group is transmitted toward a different direction from each of a second plurality of beams of the second beam group; selecting the beam of the first beam group; performing a channel state information (CSI) measurement based on a CSI-RS that corresponds to the beam of the first beam group; and transmitting the CSI measurement and a beam selection information which corresponds to the beam of the first beam group.

In one of the exemplary embodiment, the disclosure is directed to a base station which would include not limited to: a transmitter, a receiver, and a processor coupled to the transmitter and the receiver, wherein the processor is configured at least for: mapping a CSI-RS into a plurality of beams which comprises a first beam group and a second beam group, wherein each of a first plurality of beams of the first beam group is transmitted toward a different direction from each of a second plurality of beams of the second beam group; transmitting the first beam group and the second beam group; and receiving a channel state information (CSI) which correspond to a beam of the first beam group or a beam of the second beam group.

In one of the exemplary embodiment, the disclosure is directed to a user equipment which would include not limited to: a transmitter, a receiver, and a processor coupled to the transmitter and the receiver, wherein the processor is configured at least for: receiving a beam of a first beam group which is a part of a plurality of beams comprising a first beam group and a second beam group, wherein each of a first plurality of beams of the first beam group is transmitted toward a different direction from each of a second plurality of beams of the second beam group; selecting the beam of the first beam group; performing a channel state information (CSI) measurement based on a CSI-RS that corresponds to the beam of the first beam group; and transmitting the CSI measurement and a beam selection information which corresponds to the beam of the first beam group.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1H illustrates resource elements that are current available for CSI-RS transmission in a physical resource block (PRB).

FIG. 11 illustrates an adaptive port mapping scheme where the number of antenna ports mapping to CSI-RS vary over time in accordance with one of the exemplary embodiments of the disclosure.

FIG. 12 illustrates transmission of CSI-RS with different antenna ports and with different periodicities and/or time offset in accordance with one of the exemplary embodiments of the disclosure.

DETAILED DESCRIPTION OF DISCLOSED EMBODIMENTS

Figure 1A:
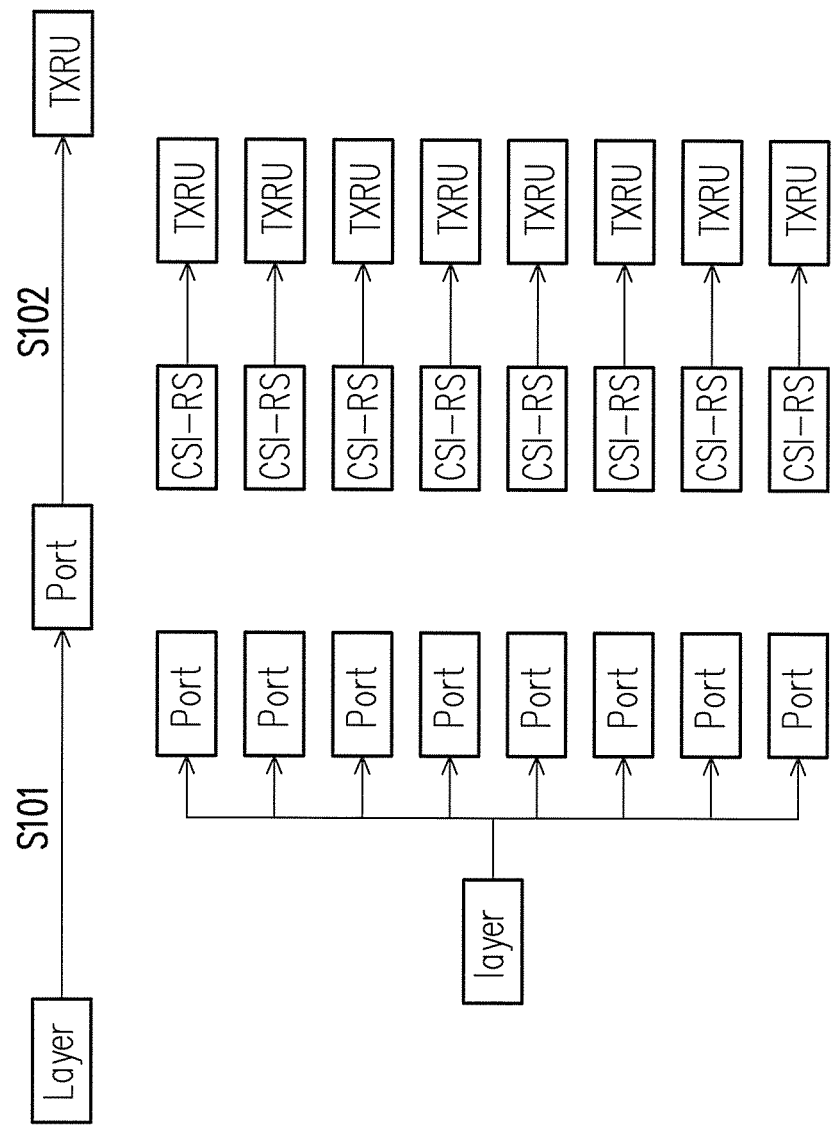
FIG. 1A illustrates an example of a process of beamforming and describes the mapping process from physical layer to antenna port and from antenna port to transceiver units (TXRU).
Figure 1B:
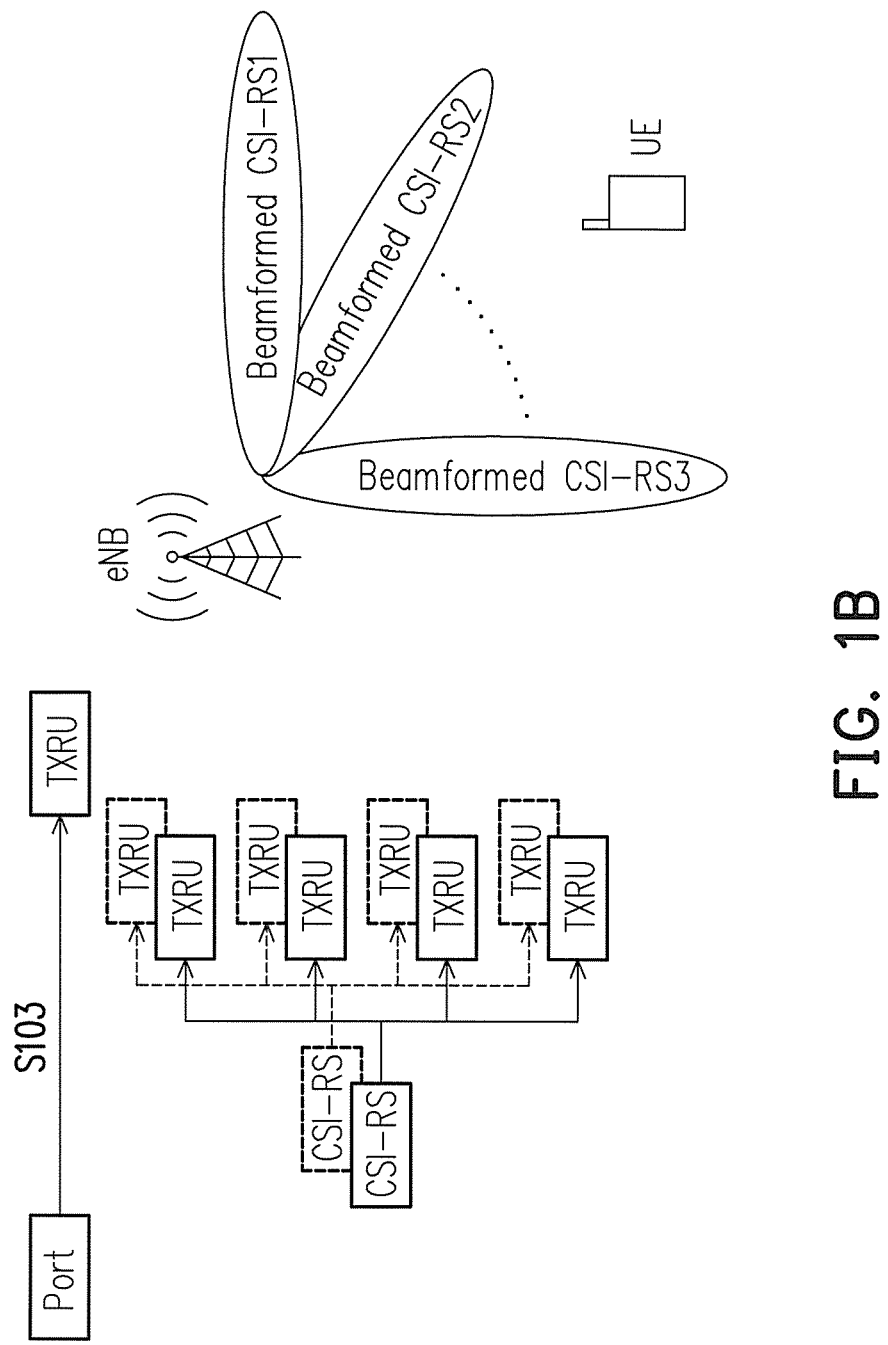
FIG. 1B illustrates an example of a more sophisticated process of beamforming with beamforming array gains.
Figure 1C:
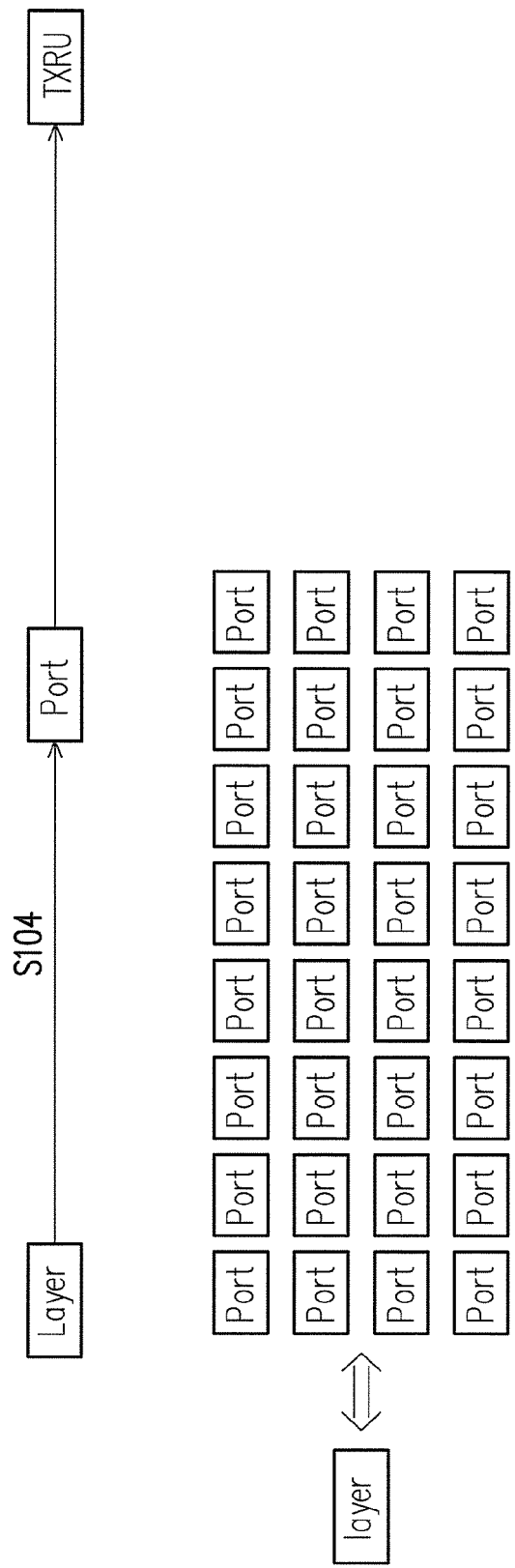
FIG. 1C illustrates an example of a process of non-precoded CSI-RS transmission.
Figure 1D:
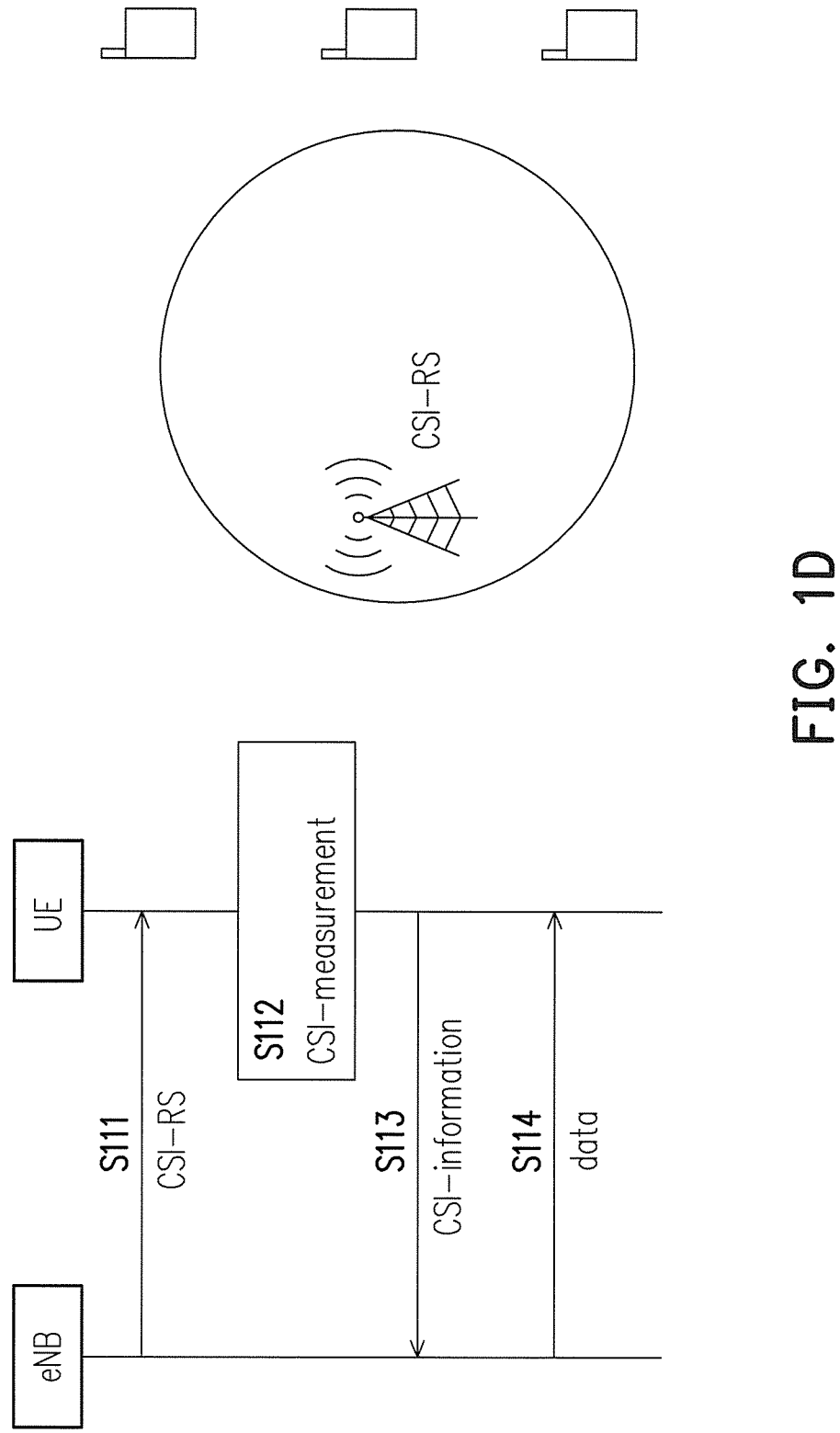
FIG. 1D illustrates a typical process of non-precoded CSI-RS transmission.
Figure 1E:
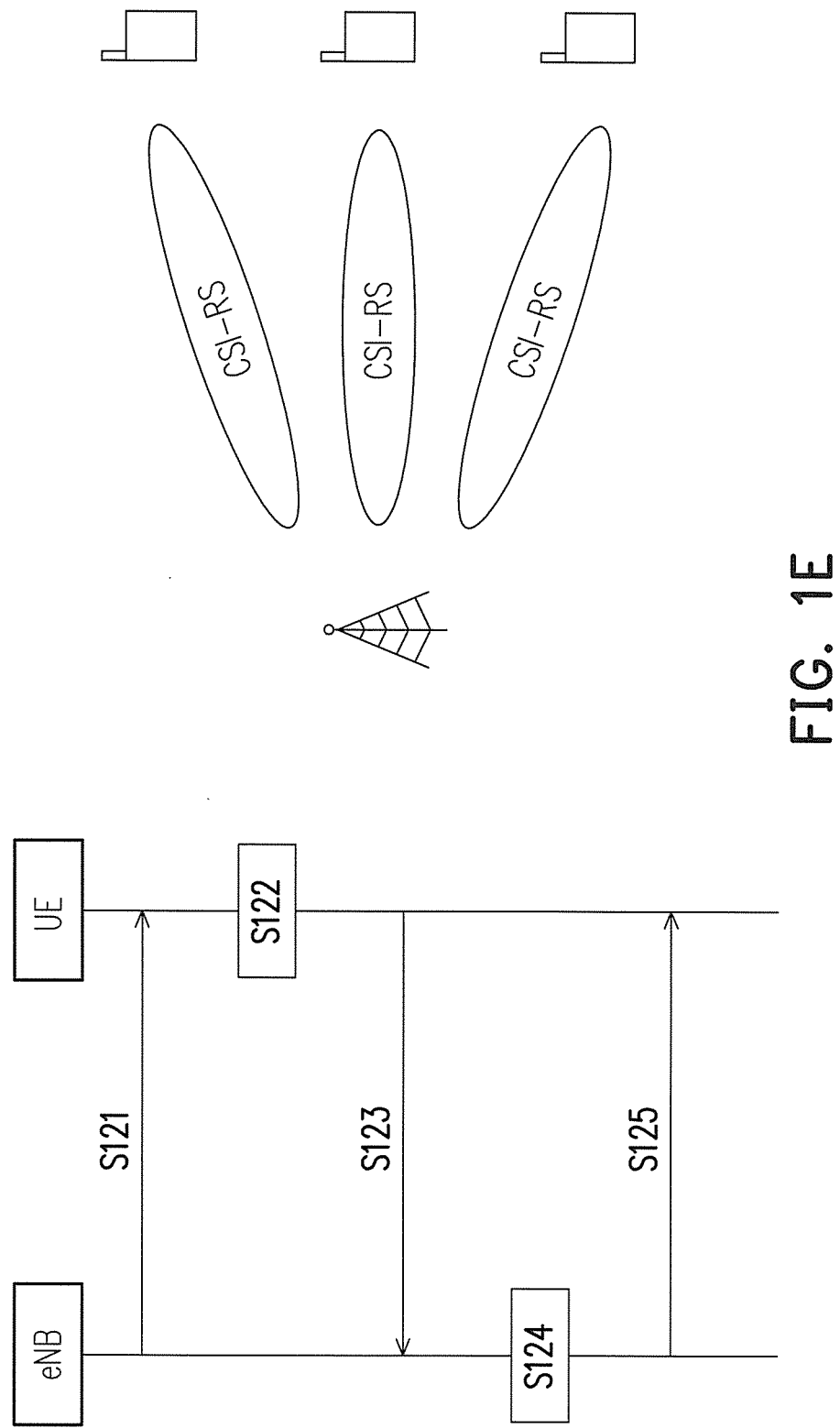
FIG. 1E illustrates a typical process of beamformed CSI-RS transmission.
Figure 1F:
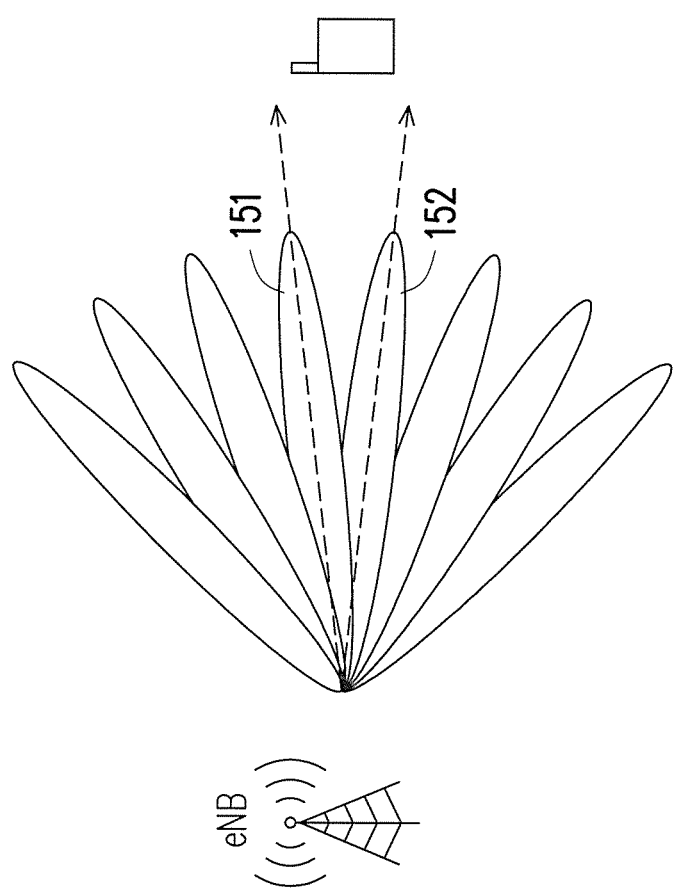
FIG. 1F illustrates an example of a UE situated in between two CSI-RS beams.

Reference will now be made in detail to the present exemplary embodiments of the disclosure, examples of which are illustrated in the accompanying drawings. Wherever possible, the same reference numbers are used in the drawings and the description to refer to the same or like parts.

This disclosure is related to enhancements of reference signals (RS) enhancements for multi-antenna communication systems. In particular, the type of RS (i.e. pilot signals) that is transmitted by the base stations for (mobile) user equipment (UEs) to measure and derive instantaneous downlink channel state information (CSI) is termed as CSI-RS for the remainder of this disclosure.

For beamformed CSI-RS enhancement where CSI-RSs are mapped to multiple TXRUs using virtualization weights to form beams, an eNB may group a plurality of beams pointing at different directions into multiple beam groups, and these beam groups could be assigned to different parts of the frequency bandwidth by resource block (RB)-wise arrangement or subband-wise arrangement. The UE may then measure CSI-RS transmitted on different beams on different parts of the frequency bandwidth. Based on the measurement results, the UE could then select one beam or multiple beams and subsequently report the selection results and/or CSI information for the selected beams to the base station.

As for the non-precoded CSI-RS scenario in which one CSI-RS port can only mapped onto one TXRU without any virtualization, the number of TXRUs could be much larger than conventional multi-antenna communication systems. Thus, this disclosure proposes an adaptive port mapping scheme where the number of antenna ports to be measured using CSI-RS can be varied over time. The applications of full-port measurement and partial-port measurement could be configured with different periodicities or could be triggered aperiodically. Furthermore, the eNB may configure only one or more CSI-RS resources per PRB pair and aggregate the CSI-RS resources over multiple subframes and/or PRBs. The number of aggregated subframes/PRBs could be dynamically controlled by the eNB.

Figure 2A:
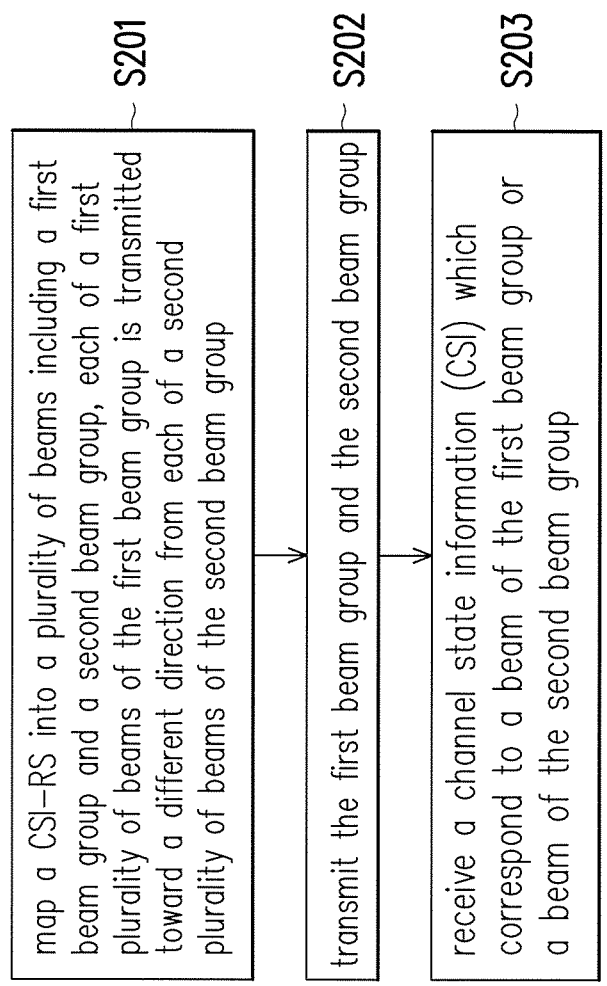
FIG. 2A illustrates a proposed method of transmitting CSI-RS from the perspective of a base station in accordance with one of the exemplary embodiments of the disclosure.

FIG. 2A illustrates a proposed method of transmitting CSI-RS from the perspective of a base station in accordance with one of the exemplary embodiments of the disclosure. In step S201, the eNB would map a CSI-RS into a plurality of beams including a first beam group and a second beam group, each of a first plurality of beams of the first beam group is transmitted toward a different direction from each of a second plurality of beams of the second beam group. In step S202, the eNB would transmit the first beam group and the second beam group. In step S203, the eNB would receive a channel state information (CSI) which correspond to a beam of the first beam group or a beam of the second beam group.

The proposed method may further include the eNB selecting a plurality of antenna ports for transmitting data in response to receiving the CSI and transmitting the data through the plurality of antenna ports.

In one of the exemplary embodiments, the first beam group is transmitted in a different time slot from the second beam group. Similarly, the first beam group may also be transmitted in a different frequency spectrum from the second beam group. The first beam group is either orthogonal from the second beam group or is allocated in an adjacent frequency from the second beam group. Furthermore, the first beam group could be transmitted in a different time slot from the second beam group and also transmitted in a different frequency spectrum from the second beam group.

In one of the exemplary embodiments, the proposed method may further include transmitting a quantity of antenna port (L) which indicates a quantity of the first plurality of beams or a quantity of the second plurality of beams. The reference signal could be transmitted with a value of oversampling factor (Q) which indicates a quantity of beam groups within the plurality of beams.

In one of the exemplary embodiments, receiving the channel state information (CSI) may further include receiving a bitmap or beam index (BI) indicating a beam selection information, and receiving the channel state information (CSI) may further include receiving a beam group index indicating a beam group selection information.

In one of the exemplary embodiments, the proposed method may further include mapping all antenna ports for CSI-RS transmission for a first predetermined period and mapping a first portion of all antenna ports for CSI-RS transmission for a second predetermined period which is right after the first predetermined period. Moreover, the eNB may map a second portion of all antenna ports for CSI-RS transmission for a third predetermined period which is between the first predetermined period and the second predetermined period. The second predetermined period would be less than the first predetermined period, and the third predetermined period would be less than the second predetermined period.

In one of the exemplary embodiments, the proposed method may further include the eNB mapping a portion all antenna ports for CSI-RS transmission indefinitely. The eNB would transmit a Full-port mapping trigger, and subsequently map all antenna ports for CSI-RS transmission in response to transmitting the Full-port mapping trigger.

In one of the exemplary embodiments, the proposed method may further include the eNB configuring a first resource block for M CSI-RS port(s), wherein M is an integer greater than zero, configuring a second resource block of N CSI-RS port(s), wherein N is an integer greater than zero, and combining the first resource block and the second resource block to aggregate M+N CSI-RS ports for a CSI-RS transmission.

In one of the exemplary embodiments, the eNB may also further transmit a configuration message which indicates that the M CSI-RS port(s) and the N CSI-RS port(s) are aggregated for transmission and physical locations of the M+N CSI-RS ports. In response to configuring the first resource block for M CSI-RS port(s), the same first resource block of a different subframe could be aggregated by the eNB for the CSI-RS transmission. Also, in response to configuring the first resource block for M CSI-RS port(s), the same first resource block of a different physical resource block is aggregated by the eNB for the CSI-RS transmission.

Figure 2B:
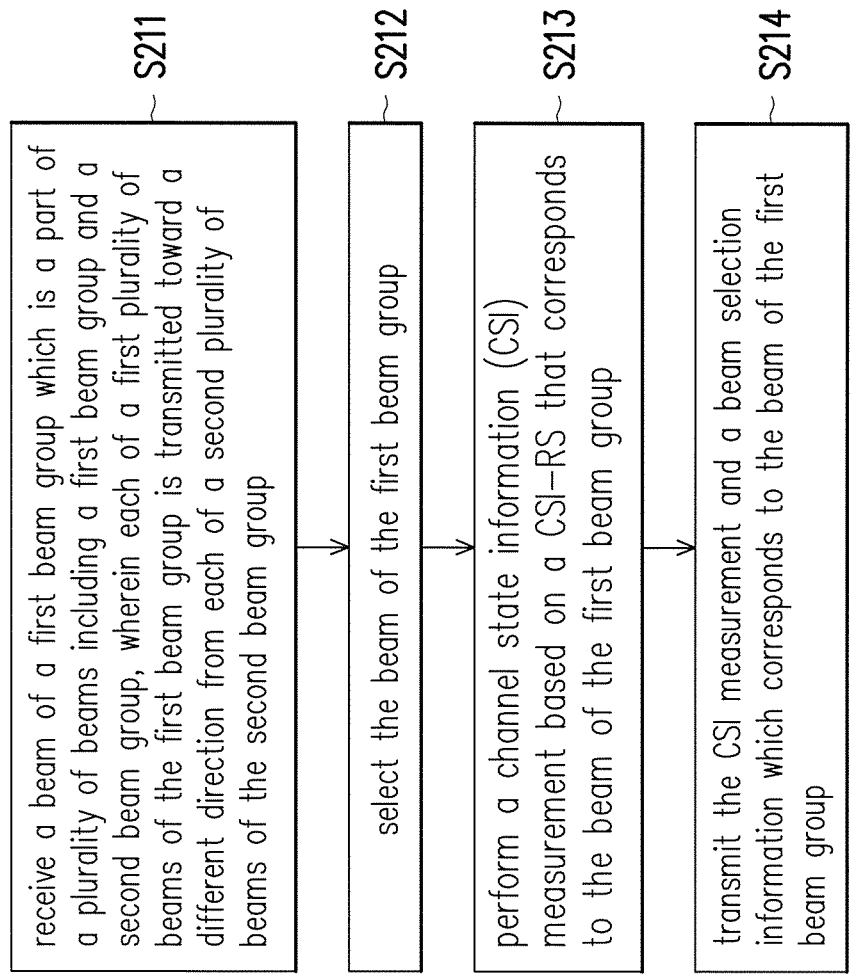
FIG. 2B illustrates a proposed method of transmitting CSI-RS from the perspective of a user equipment in accordance with one of the exemplary embodiments of the disclosure.

FIG. 2B illustrates a proposed method of transmitting CSI-RS from the perspective of a user equipment in accordance with one of the exemplary embodiments of the disclosure. In step S211, UE would receive a beam of a first beam group which is a part of a plurality of beams including a first beam group and a second beam group, wherein each of a first plurality of beams of the first beam group is transmitted toward a different direction from each of a second plurality of beams of the second beam group. In step S212, the UE would select the beam of the first beam group. In step S213, the UE would perform a channel state information (CSI) measurement based on a CSI-RS that corresponds to the beam of the first beam group. In step S214, the UE would transmit the CSI measurement and a beam selection information which corresponds to the beam of the first beam group.

In one of the exemplary embodiments, The UE may further receive a quantity of antenna port (L) which indicates a quantity of the first plurality of beams or a quantity of the second plurality of beams, receive a value of oversampling factor (Q) which indicates a quantity of beam groups within the plurality of beams.

In one of the exemplary embodiments, the UE transmitting the CSI measurement may further include transmitting a bitmap or beam index (BI) indicating a beam selection information or transmitting a beam group index indicating a beam group selection information.

Figure 3A:
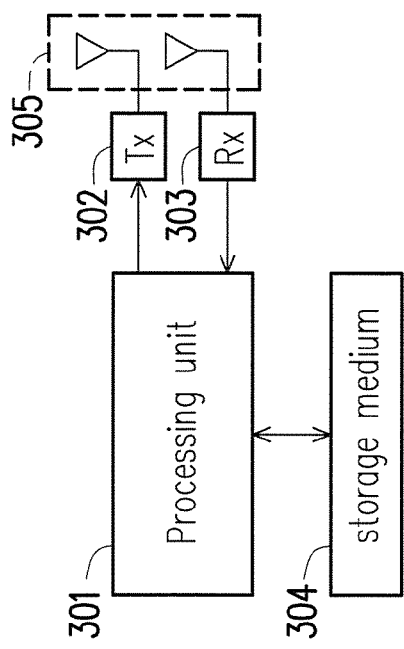
FIG. 3A illustrates the hardware of a base station in terms of functional block diagrams in accordance with one of the exemplary embodiments of the disclosure.

FIG. 3A illustrates an exemplary base station in terms of functional block diagram in accordance with the disclosure. The base station would include not limited to a processing unit 301 electrically coupled to a transmitter 302, a receiver 303, and a non-transitory storage medium 304. The transmitter 302 contains circuits for transmitting wireless signal in a radio frequency spectrum, whereas the receiver 303 contains circuits for receiving wireless signals. The non-transitory storage medium 304 may contain volatile and nonvolatile memories to store temporarily or permanent information such as programming codes, codebooks, various temporary and permanent data, and so forth. The processing unit 301 contains one or more processors and processes digital signals to perform the proposed method of transmitting CSI-RS described in FIG. 2A as well as subsequently described exemplary embodiments of the disclosure. The functions of the processing unit 301 could be implemented by using programmable units such as a microprocessor, a micro-controller, digital signal processor (DSP) chips, a field-programmable gate array (FPGA), etc. The functions of the processing unit 301 may also be implemented with separate electronic devices or ICs, and functions performed by the processing unit 301 may also be implemented within the domains of either hardware or software.

Figure 3B:
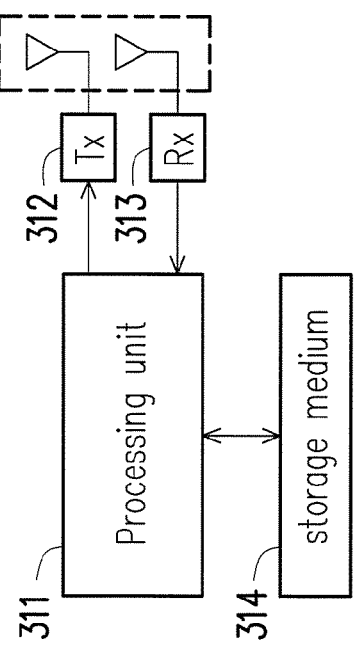
FIG. 3B illustrates the hardware of a user equipment in terms of functional block diagrams in accordance with one of the exemplary embodiments of the disclosure.

FIG. 3B an exemplary user equipment in terms of functional block diagram in accordance with the disclosure. The user equipment would include not limited to a processing unit 311 electrically coupled to a transmitter 312, a receiver 313, and a non-transitory storage medium 314. The transmitter 312 contains circuits for transmitting wireless signals, and the receiver 313 contains circuits for receiving wireless signals. The non-transitory storage medium 314 may contain volatile and nonvolatile memories to store temporarily or permanent information such as programming codes, codebooks, various temporary and permanent data, and so forth. The processing unit 311 contains one or more processors and processes digital signal and to perform the proposed method of receiving a CSI-RS as described in FIG. 2B as well as subsequently described exemplary embodiments of the disclosure. The functions of the processing unit 311 could be implemented by using programmable units such as a microprocessor, a micro-controller, digital signal processor (DSP) chips, a field-programmable gate array (FPGA), etc. The functions of the processing unit 311 may also be implemented with separate electronic devices or ICs, and functions performed by the processing unit 311 may also be implemented within the domains of either hardware or software.

The exemplary embodiments of FIG. 4A~FIG. 10 and their corresponding written descriptions disclose the scenario of beamformed CSI-RS. The CSI-RS could be generated by an eNB according to Equation (1), where $x^l$ could be a Discrete Fourier Transform (DFT)-based vector with size T x1, for l=0, . . . TQ−1, where L=TQ equals to the number of antenna ports, T equals to the number of TXRUs per array, and spatial oversampling factor of Q.

$$x^l = \begin{bmatrix} 1 & e^{2j\pi \frac{l}{TQ}} & \cdots & e^{2j\pi \frac{(T-1)l}{TQ}} \end{bmatrix}, l = 0, \ldots, TQ-1 \quad \text{Equation (1)}$$

However, since there would only be 8 antenna ports to be measured for the case of beamformed CSI-RS, the disclosure proposes using oversampled beams demarcated into different groups with each beam pointing at different directions to increase the resolution of coverage in the Azimuth domain.

Figure 4A:
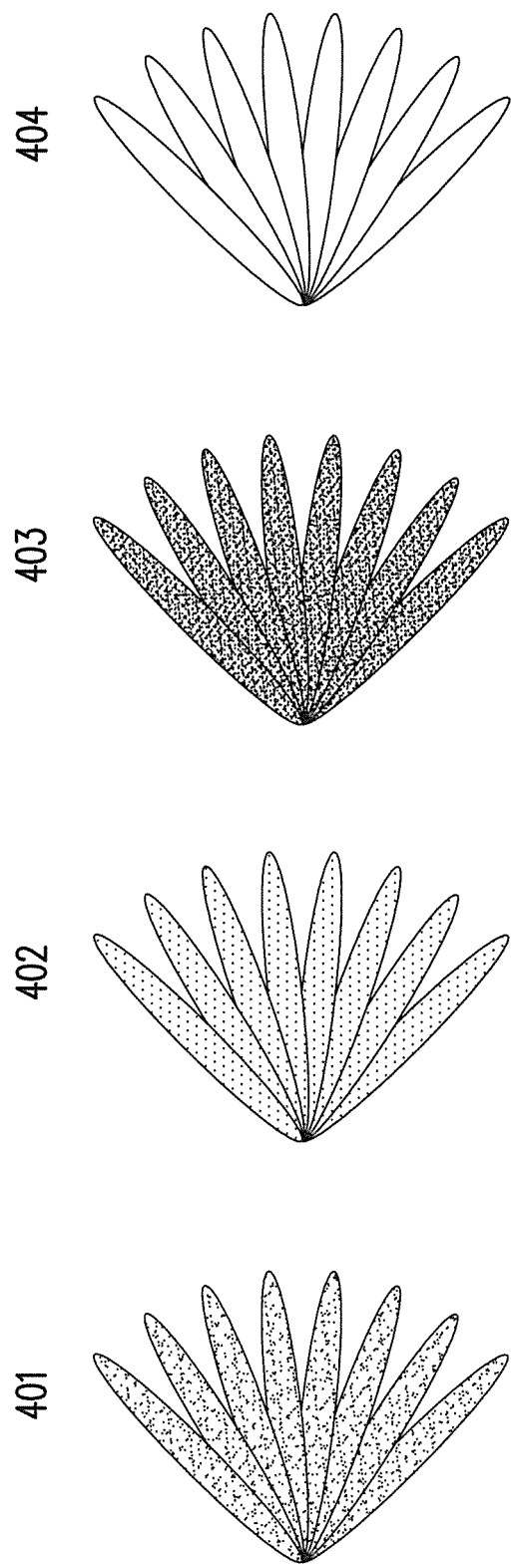
FIG. 4A illustrates using orthogonal beam groups in a RB wise arrangement in accordance with one of the exemplary embodiments of the disclosure.

FIG. 4A illustrates using orthogonal beam groups in a RB wise arrangement in accordance with one of the exemplary embodiments of the disclosure. For this exemplary embodiment, assuming that Q=4, there would be four beam groups that include a first beam group 401, a second beam group 402, a third beam group 403, and a fourth beam group 404. Each of the beams of the second beam group 402 could be slightly rotated from each of the beams of the first beam group 401 such that the beams for the second beam group 402 may cover blind spots of the beams of the first beam group 401. The same concept would be applied to the third beam group 403 and the fourth beam group 404 which would further cover the blind spots of the first beam group 401 and the second beam group 402. In general, there could be Q beam groups with each of the beam groups having L beams. Each of the beam groups of the exemplary embodiment of FIG. 4A would be orthogonal from each other.

Figure 4B:
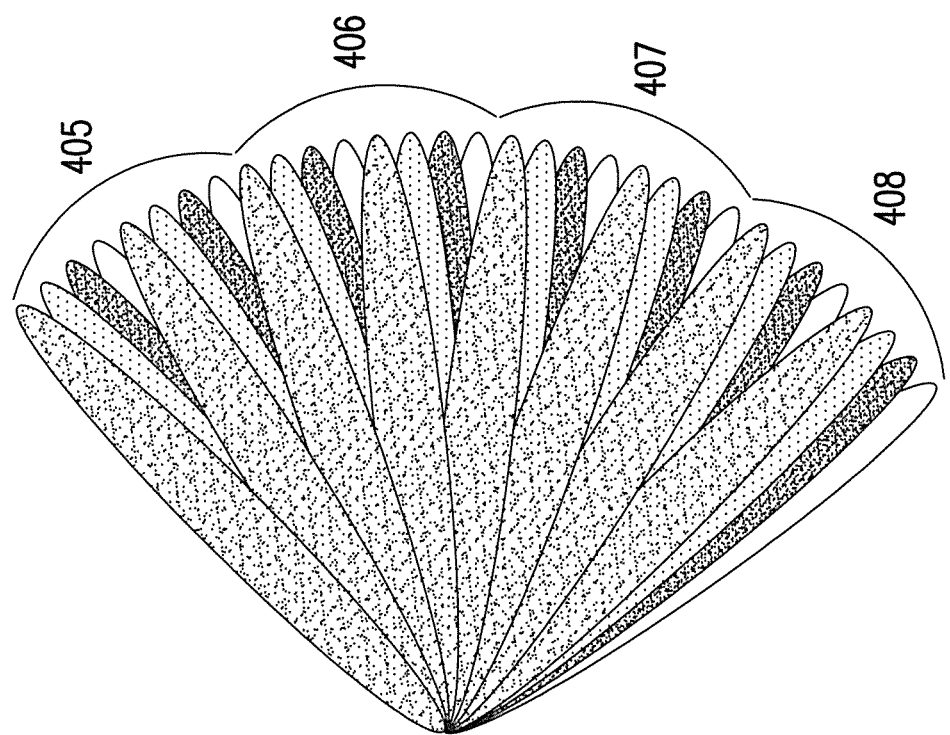
FIG. 4B illustrates using adjacent beam groups in a RB wise arrangement in accordance with one of the exemplary embodiments of the disclosure.

For another exemplary embodiment shown in FIG. 4B, adjacent Q beam groups in a RB wise arrangement are grouped into a first beam group 405, a second beam group 406, a third beam group 407, and a fourth beam group 408 as shown in FIG. 4B which shows that Q=4 beam groups with each beam group having L beams are arranged in adjacent frequencies among each other.

Figure 5A:
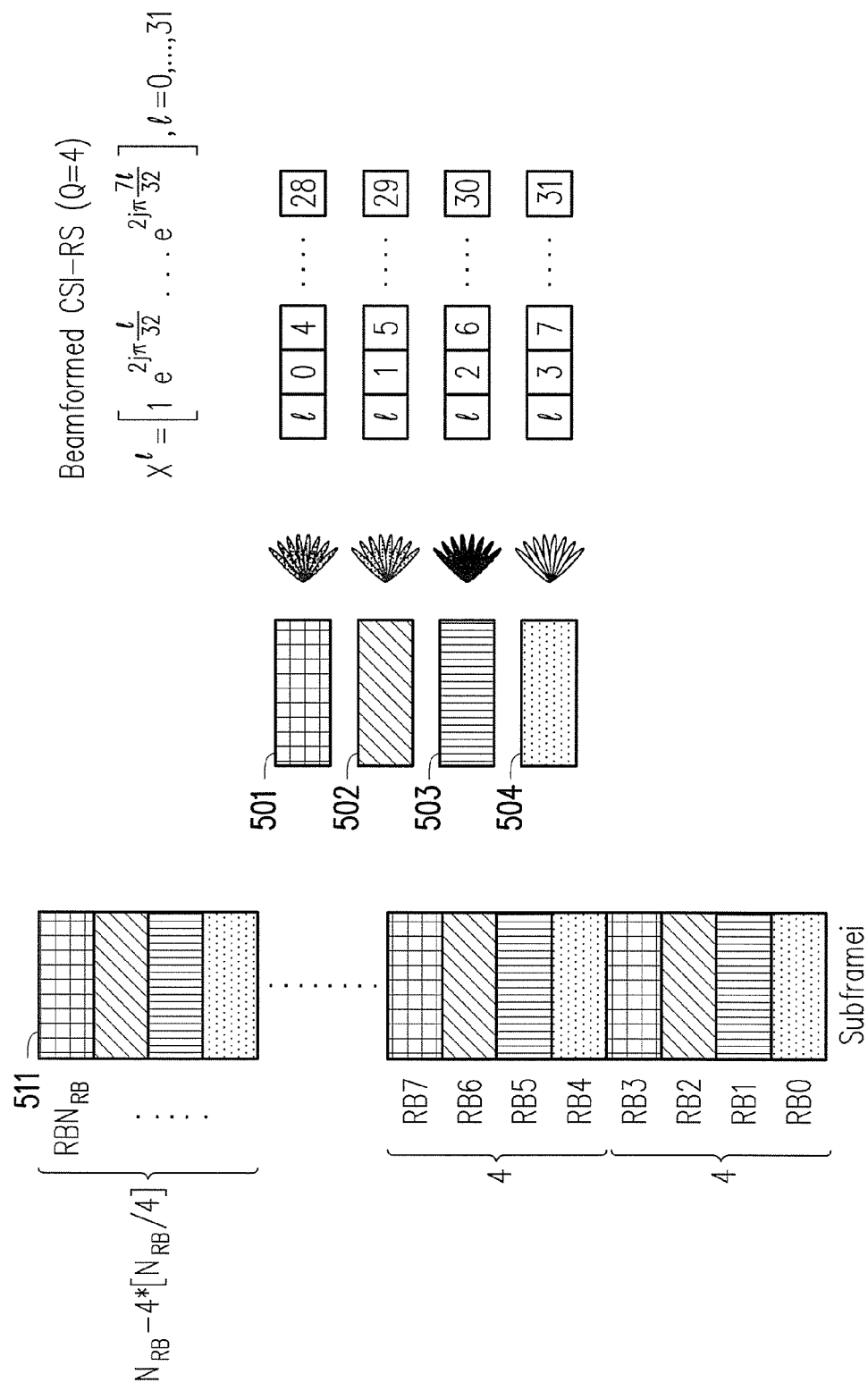
FIG. 5A illustrates a frequency domain arrangement of orthogonal beam groups in accordance with one of the exemplary embodiments of the disclosure.

FIG. 5A illustrates the frequency domain arrangement of the exemplary embodiment of FIG. 4A. For this exemplary embodiment, different beam groups are transmitted via different resource blocks 511. For example, a first beam group 501 which could be identical to the first beam group 401, is transmitted on RB 3, 7, 11, and so forth; a second beam group 502 which could be identical to the second beam group 402, is transmitted on RB 2, 6, 10, and so forth; a third beam group 503 which could be identical to the third beam group 403, is transmitted on RB 1, 5, 9, and so forth; and a fourth beam group 504 which could be identical to the fourth beam group 404, is transmitted on RB 0, 4, 8, and so forth.

Figure 5B:
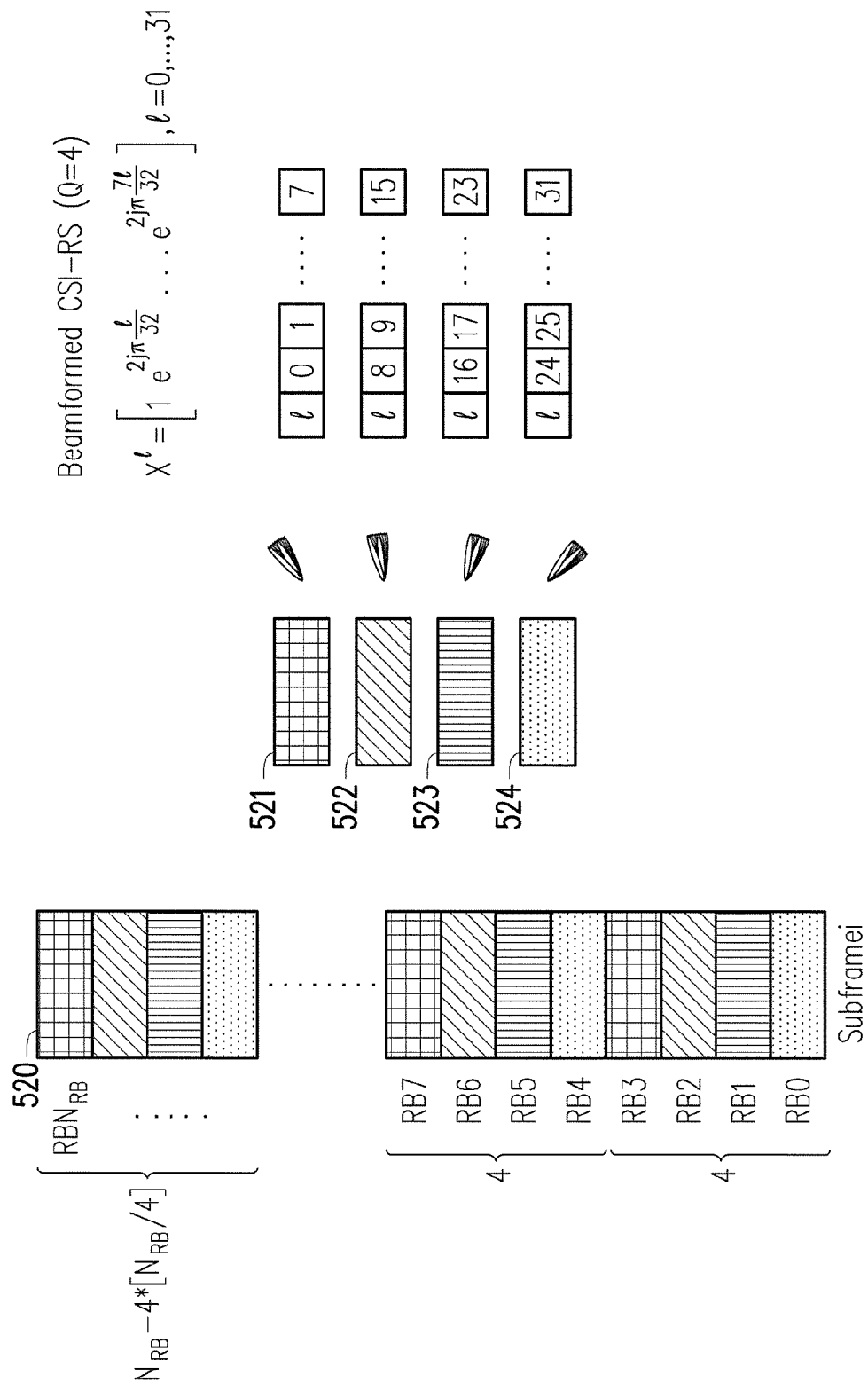
FIG. 5B illustrates a frequency domain arrangement of adjacent beam groups in accordance with one of the exemplary embodiments of the disclosure.

FIG. 5B illustrates a frequency domain arrangement of adjacent beam groups in accordance with one of the exemplary embodiments of the disclosure. For this exemplary embodiment, different beam groups are transmitted via different resource blocks 520. For example, a first beam group 521 which could be identical to the first beam group 405, is transmitted on RB 3, 7, 11, and so forth; a second beam group 522 which could be identical to the second beam group 406, is transmitted on RB 2, 6, 10, and so forth; a third beam group 523 which could be identical to the third beam group 407, is transmitted on RB 1, 5, 9, and so forth; and a fourth beam group 524 which could be identical to the fourth beam group 408, is transmitted on RB 0, 4, 8, and so forth.

Figure 6:
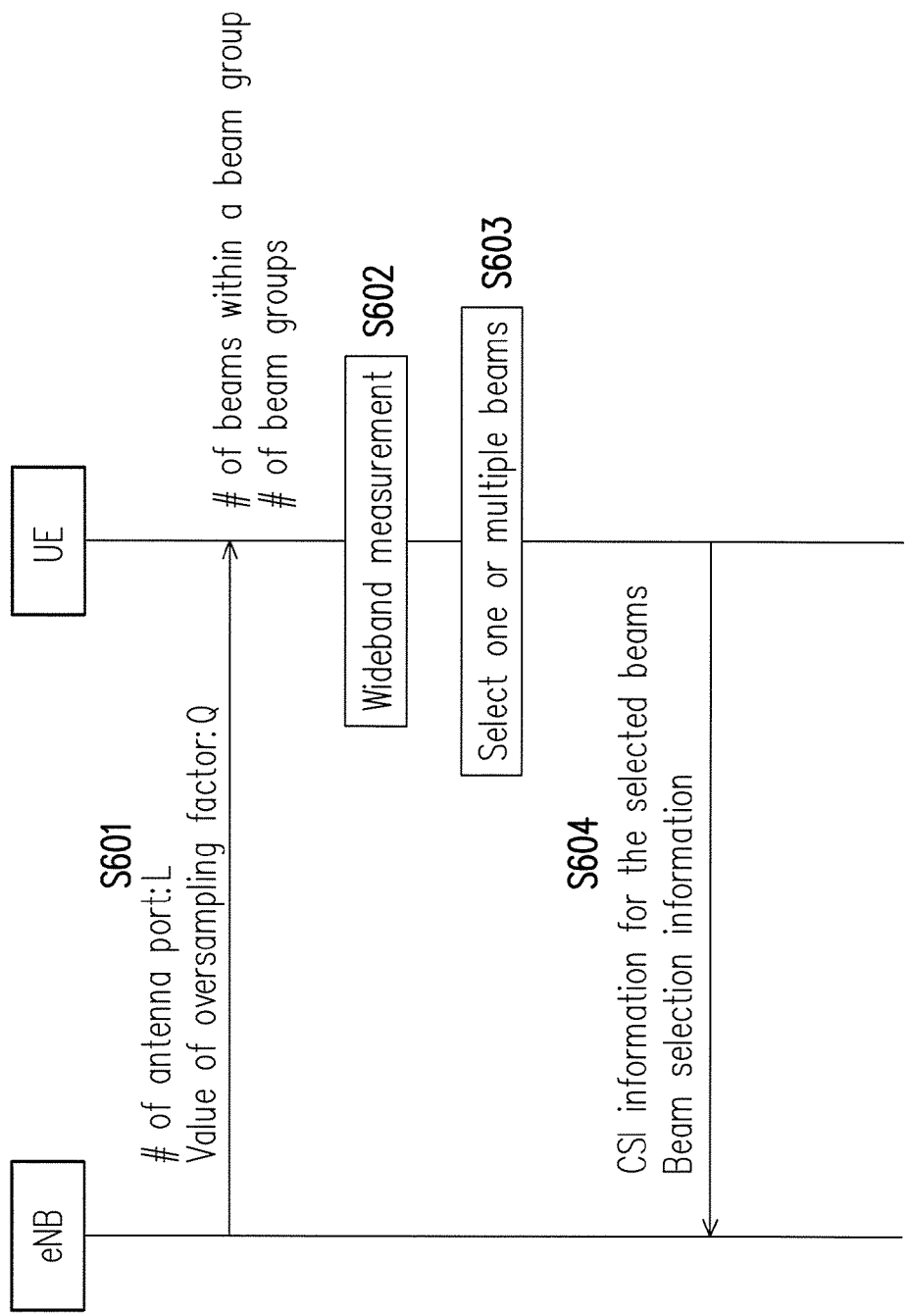
FIG. 6 illustrates the process of allocating beam groups in a RB wise arrangement in accordance with one of the exemplary embodiments of the disclosure.

FIG. 6 illustrates the process of allocating beam groups in a RB wise arrangement in accordance with one of the exemplary embodiments of the disclosure. In step S601, the eNB may transmit to the UE a CSI-RS which may include the total number of antenna port (L) and the value of oversampling factor (Q). In response to receiving the CSI-RS, in the UE would know from (L) the number of beams within a beam group and from (Q) and the number of beam groups (L). In step S602, the UE may perform a wideband measurement of CSI based on the information received from step S601. In step S603, the UE would select one of the beams or multiple beams for receiving user data. In step S604, the UE would transmit to the eNB the CSI which was measured for the one of the beam or the multiple beams that were selected and as well as the information related to the beam selection.

The beam selection information could be represented according to two exemplary embodiment. The first exemplary embodiment is to represent the beam selection information by a bitmap in which QL bits would represent multiple beams or a beam index in which $\log_2(QL)$ bits would represent one beam. For example, if there are 4 beam groups (Q=4) and each beam group contains 8 beams (L=8), then a bitmap of 32 bits could be used to represent multiple beams or beam index of 5 bits could be used to represent one beam.

The second exemplary embodiment is to utilize a beam group index represented by $\log_2(Q)$ bits as well as either a bitmap containing L bits to represent multiple beams or a beam index in which $\log_2(QL)$ bits would represent one beam. The beam group index could be reported with a longer reporting frequency whereas the beam index within the beam group could be reported with a shorter reporting frequency. In this way, the payload required to report the beam selection information would be reduced. For example, the beam group index could be 2 bits to represent 4 different beam groups, the bitmap could contain 8 bits to represent multiple beams, and a beam index of 3 bits may represent one beam.

Figure 7:
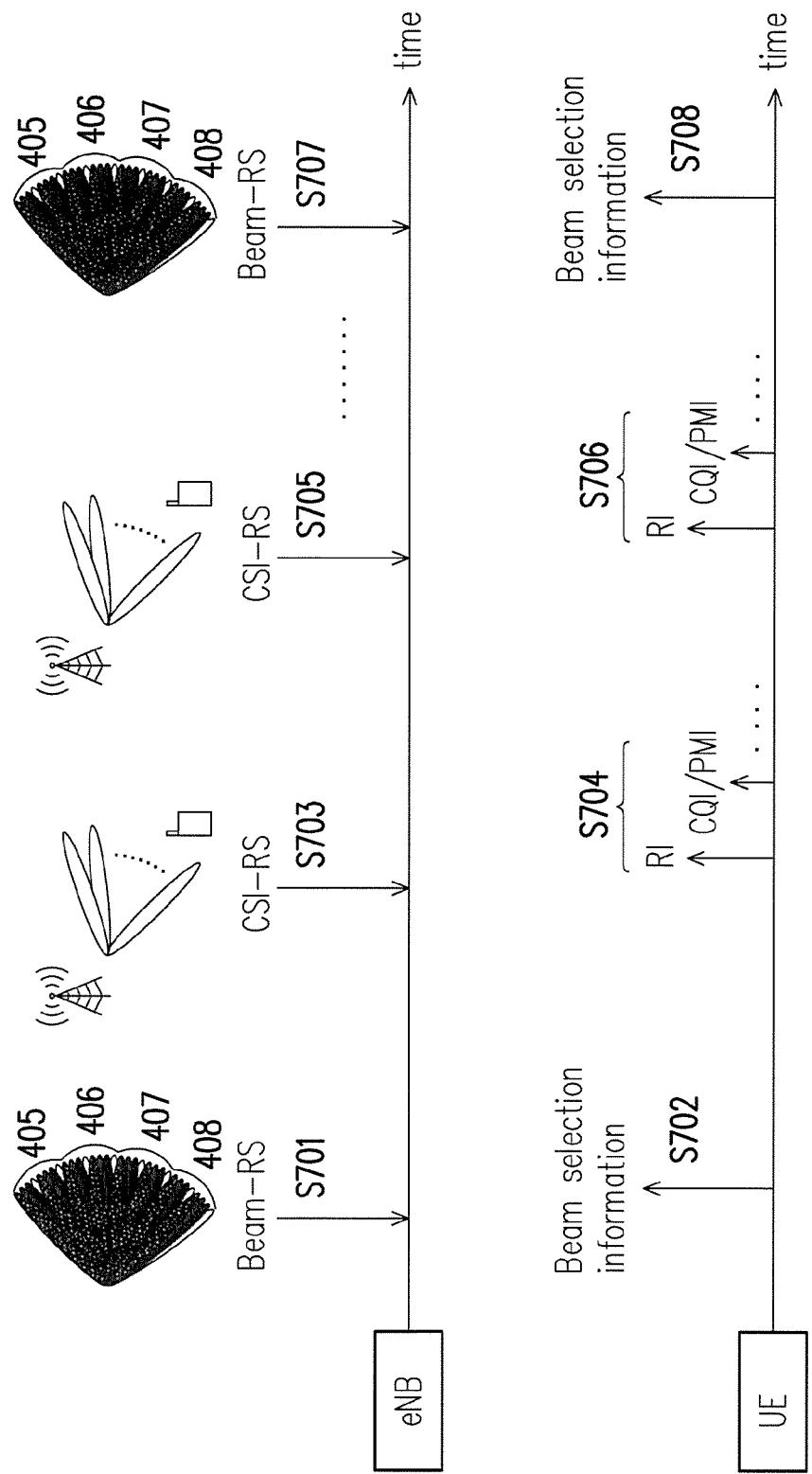
FIG. 7 illustrates the process of beamforming CSI-RS in accordance with one of the exemplary embodiments of the disclosure.

FIG. 7 illustrates the process of beamforming CSI-RS in accordance with one of the exemplary embodiments of the disclosure. In step S701, the eNB may transmit CSI-RS according to the beam groups configuration such as the one described in FIG. 4A or FIG. 4B for example. In step S702, the UE select one beam or multiple beams and subsequently transmit the information of the beam selection to eNB. In step S703, the eNB may transmit one or more CSI-RSs to the UE based on the one beam or multiple beams that were selected by the UE. There could be two optional ways to transmit the one beam or multiple beams. One optional way is for the beam transmitted from the eNB to be the same as the information of beam selection transmitted to the eNB. The other optional way is for the beams transmitted from the eNB to not follow the suggestion of the beam selection information of step S702 but instead the eNB would provide additional information about what the exact beams are to be transmitted to the UE. In step S704, the UE would perform CQI measurement based on the CSI-RS received in step S703 and subsequently transmit the measured CQI or a preferred precoder matrix index (PMI) to the eNB. The steps of S703 and S704 could be repeated multiple times as shown by steps S705 and S706 in FIG. 7. The steps of S701 and S702 could be repeated multiple times as shown by steps S707 and S708.

Figure 8:
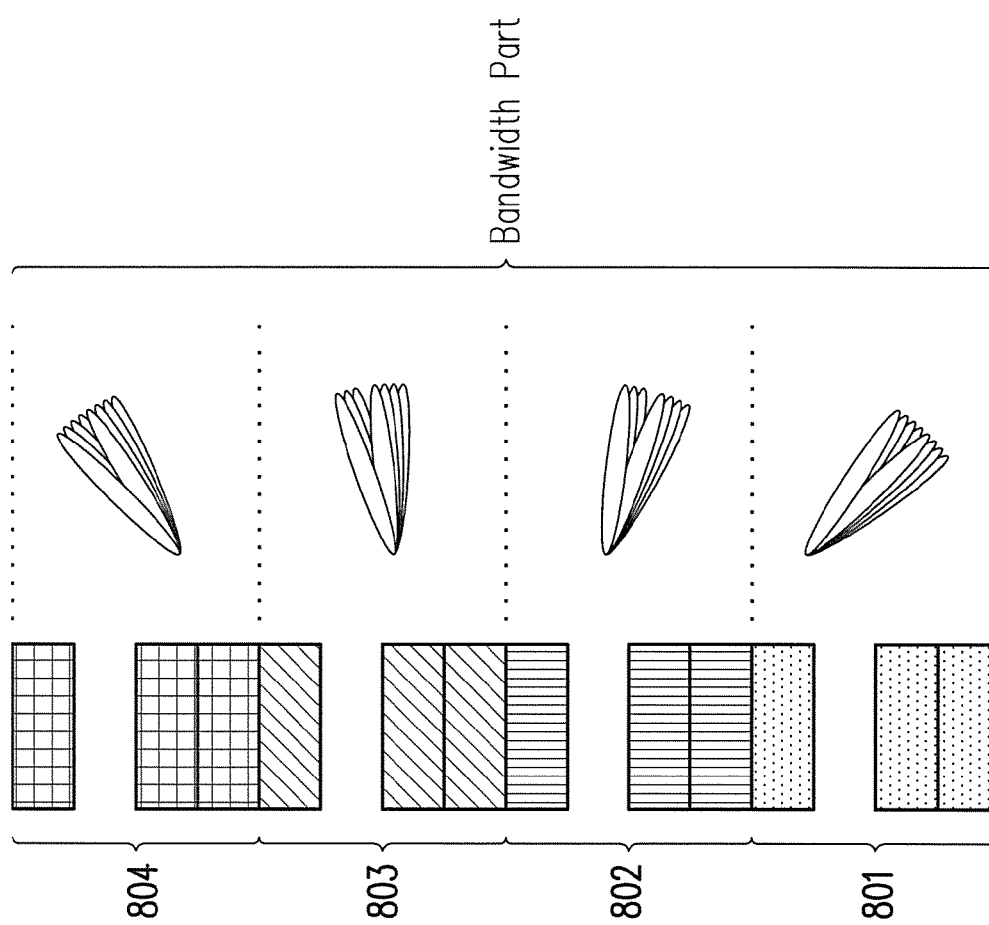
FIG. 8 illustrates allocating beam groups in a subband-wise arrangement in accordance with one of the exemplary embodiments of the disclosure.

In contrast to the RB wise arrangement such the one shown in FIG. 5A and FIG. 5B, the different CSI-RS ports may also be assigned in beam groups to be transmitted in a subband-wise arrangement in accordance with another one of the exemplary embodiments of the disclosure as shown in FIG. 8. For the subbband-wise arrangement, for example the first beam group 405 could be allocated in a first subband 801, the second beam group 406 could allocated in a second subband 802, the third beam group 407 could be allowed in a third subband 803, and the fourth beam group 408 could be allowed in a fourth subband 804.

Figure 9:
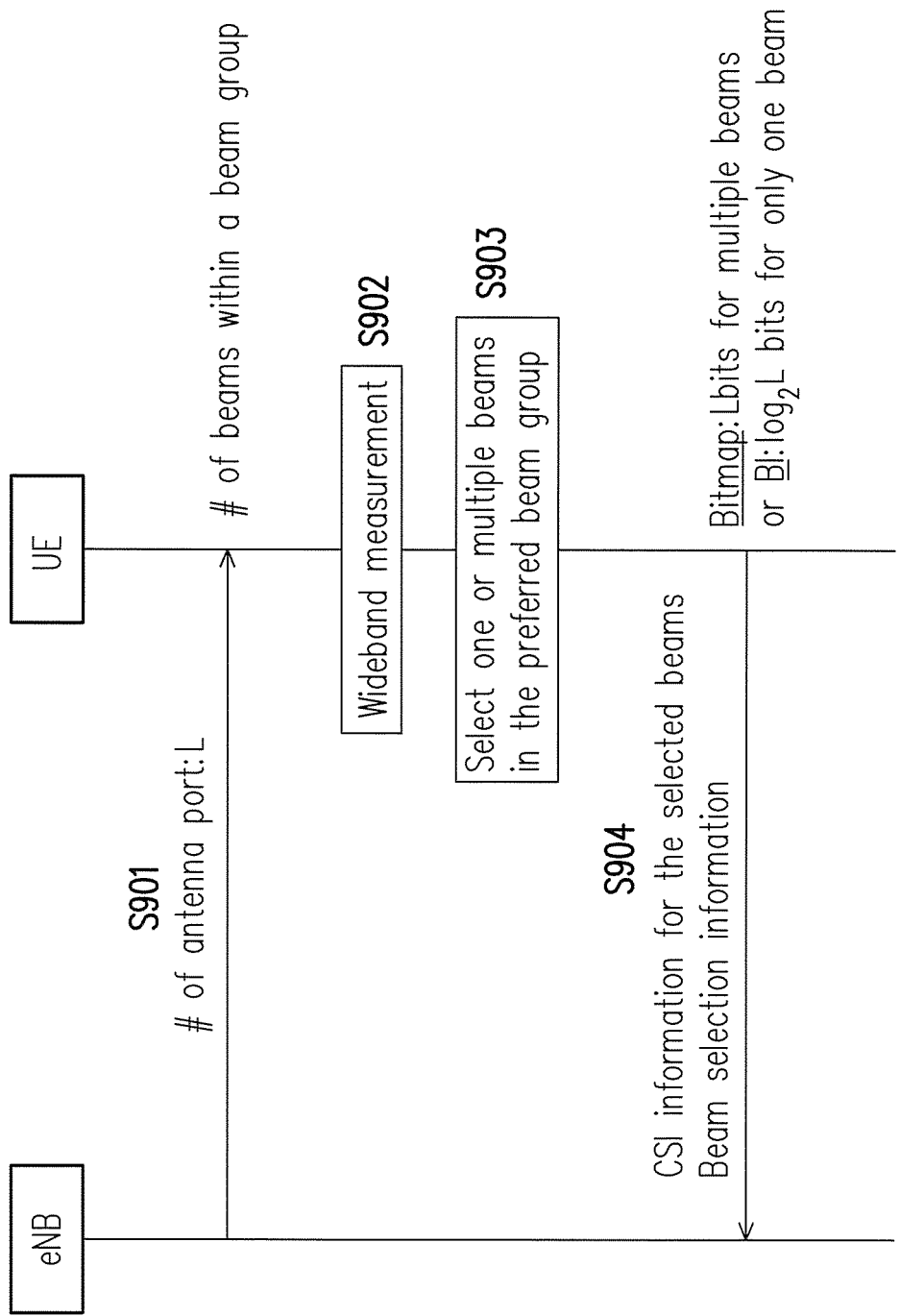
FIG. 9 illustrates the process of allocating beam groups in a RB wise arrangement in accordance with one of the exemplary embodiments of the disclosure.

FIG. 9 illustrates the process of allocating beam groups in a RB wise arrangement in accordance with one of the exemplary embodiments of the disclosure. In step S901, the eNB may transmit to the UE a CSI-RS which may include the total number of antenna port (L). In response to receiving the CSI-RS, in the UE would know from (L) the number of beams within a beam group. In step S902, the UE may perform a measurement of a specific subband to derive the CSI based on the information received from step S901. In step S903, the UE would select one of the beams or multiple beams for receiving user data. In step S904, the UE would transmit to the eNB the CSI which was measured for the one of the beam or the multiple beams that were selected and as well as the information related to the beam selection (i.e. beam selection information). The beam selection information could be represented by a bitmap which contains L bits for multiple beams or a beam indicator which contains $\log_2 L$ bits to represent only one beam.

Figure 10:
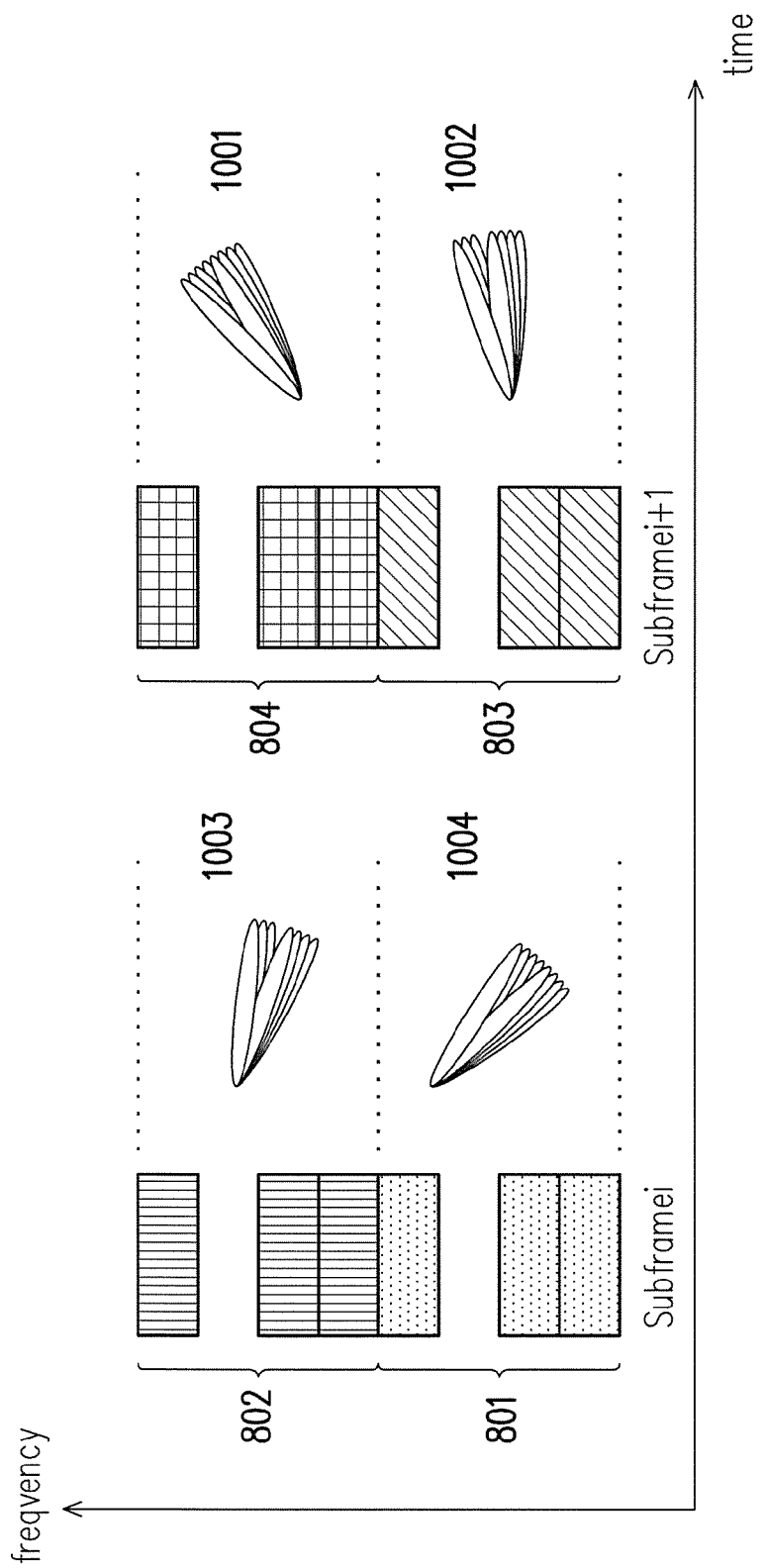
FIG. 10 illustrates arranging beam groups in both frequency domain and time domain in accordance with one of the exemplary embodiments of the disclosure.

FIG. 10 illustrates arranging beam groups in both frequency domain and time domain in accordance with one of the exemplary embodiments of the disclosure. It is assumed that a plurality of beams with each beam containing a CSI-RS is demarcated by the eNB into 4 beam groups (Q=4) in a way which is similar to the embodiment of FIG. 4B. The beam groups would include a first beam group 1001, a second beam group 1002, a third beam group 1003, and a fourth beam group 1004. In the example of FIG. 10, within a first time slot, the first subband 801 could be allocated to transmit a fourth beam group 1004, the second subband 802 could be allocated to transmit a third beam group 1003. Within a second time slot after the first time slot, the third subband 803 could be allocated to transmit a second beam group 1002, and the fourth subband 804 could be allocated to transmit a first beam group 1001.

As for non-precoded CSI-RS, FIG. 11~FIG. 16B and their corresponding written descriptions provide solutions to cope with a large number of antenna ports. FIG. 11 illustrates an adaptive port mapping scheme where the number of antenna ports mapping to CSI-RS vary over time in accordance with one of the exemplary embodiments of the disclosure. For this exemplary embodiment, it is assumed that a FD-MIMO transmitter has a total of 16 antenna ports. At time T1101, an eNB may implement the Full-port mapping mode in which all 16 antenna ports are mapped to the CSI-RS ports for the CSI-RS transmission. At time T1102, the eNB may implement the Partial-port mapping mode in which only 8 out of 16 antenna ports would be mapped to CSI-RS ports for the CSI-RS transmission. At time T1103, the eNB may implement a different Partial-port mapping mode in which only 12 out of 16 antenna ports would be mapped to CSI-RS ports for the CSI-RS transmission. It is worth noting that the number of antenna ports to be mapped can be dynamically controlled by the eNB.

FIG. 12 illustrates transmission of CSI-RS with different number of antenna ports and with different periodicities and/or time offset in accordance with one of the exemplary embodiments of the disclosure. For this exemplary embodiment, it is also assumed that a FD-MIMO transmitter has a total of 16 antenna ports. At time T1201, an eNB may implement the Full-port mapping mode in which all 16 antenna ports are mapped to the CSI-RS ports for the CSI-RS transmission. Within time period T1202, the eNB may map only 4 out of 16 antenna ports for the CSI-RS transmission. At time T1203, the eNB may implement the Partial-port mapping mode in which only 8 out of 16 antenna ports would be mapped to CSI-RS ports for the CSI-RS transmission. Within time period T1204, the eNB may map only 4 out of 16 antenna ports for the CSI-RS transmission. At time T1205, the eNB may implement the Full-port mapping mode in which all 16 antenna ports are mapped to the CSI-RS ports for the CSI-RS transmission. In this exemplary embodiment, CSI-RS transmission for 16 ports (i.e. Full-port mapping) would occur every 40 milliseconds, CSI-RS transmission for 8 ports (i.e. Partial-port mapping) would occur every 20 milliseconds, and CSI-RS transmission for 4 ports (i.e. Partial-port mapping) would occur every 5 milliseconds. When collision occurs (i.e. CSI-RS transmissions with different number of mapped ports occur in the same subframe), either CSI-RS with the largest number of ports or CSI-RS with the smallest number of ports has the priority to transmit.

Figure 13:
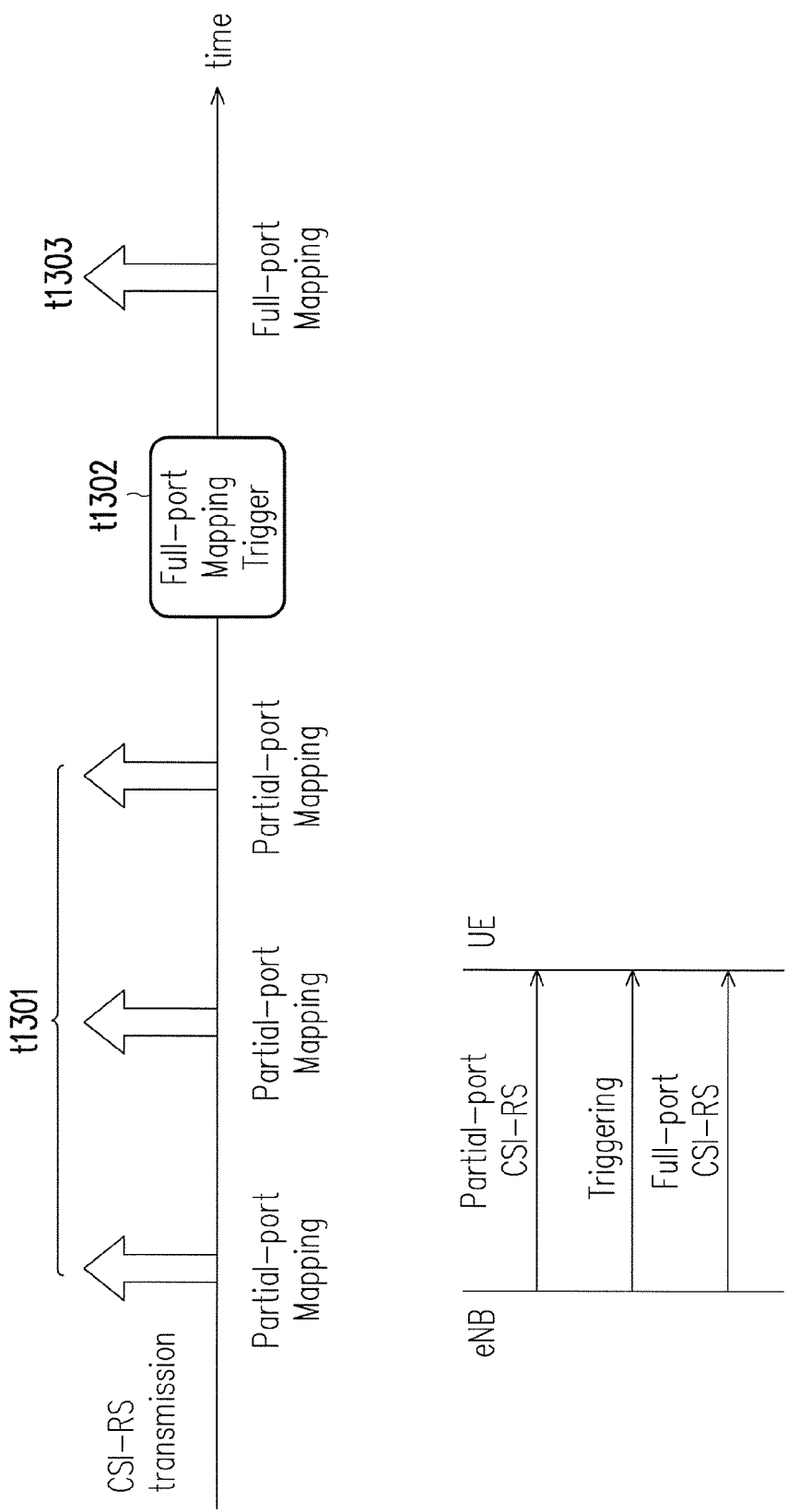
FIG. 13 illustrates partial port mapping alternating with full port mapping for CSI-RS transmission in accordance with one of the exemplary embodiments of the disclosure.

FIG. 13 illustrates partial port mapping alternating with full port mapping for CSI-RS transmission in accordance with one of the exemplary embodiments of the disclosure. For this exemplary embodiment, it is also assumed that a FD-MIMO transmitter has a total of 16 antenna ports. Within time period T1301, an eNB may implement the Partial-port mapping mode in which a portion of all 16 antenna ports are mapped to the CSI-RS ports for the CSI-RS transmission. The Partial-port mapping mode could be implemented for a specific period or indefinitely until a trigger has occurred. The trigger could be generated by an eNB or a UE. For example, the Partial-port mapping for CSI-RS transmission could be the default mode of operation which transpires indefinitely until at time T1302, a full mapping trigger is transmitted from the eNB to the UE. At time T1303, in response to the full mapping trigger, the eNB would implement the Full-port mapping mode in which all 16 antenna ports are mapped to the CSI-RS ports for the CSI-RS transmission. The CSI-RS transmission based on Full-port mapping may occur when the system has experienced poor quality of service (QoS). When very frequency HARQ retransmissions occur, the QoS is most likely poor.

Figure 1G:
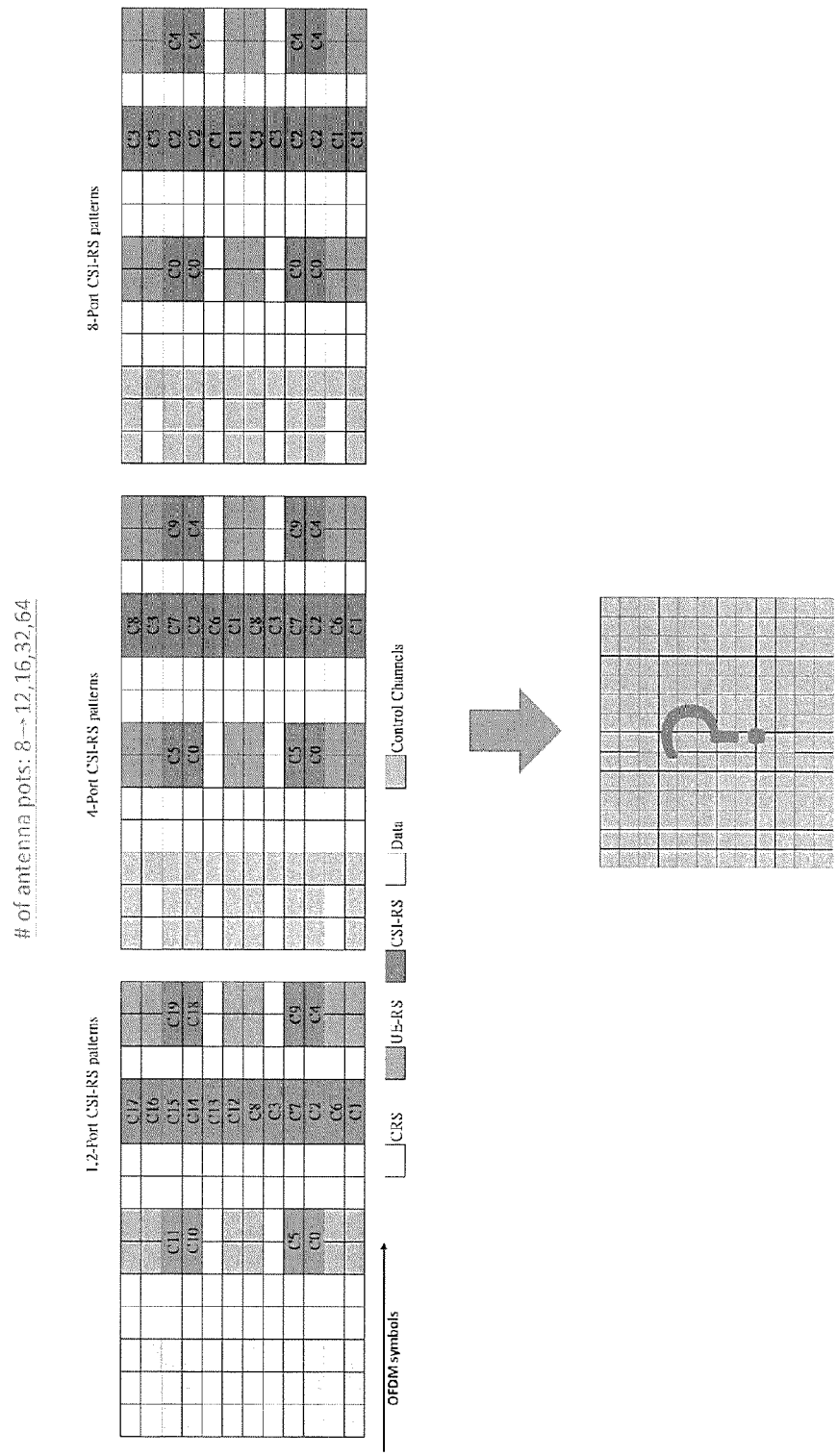
FIG. 1G illustrates the mapping difficulties between an increased number of CSI-RS ports and antenna ports.
Figure 14:
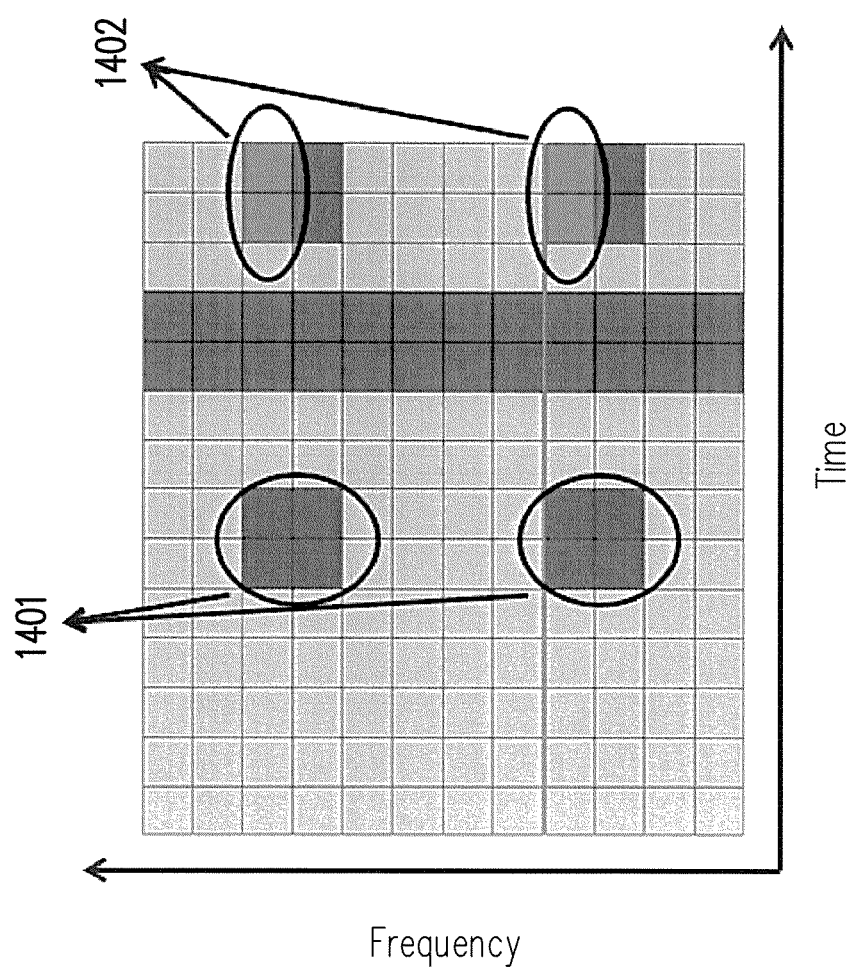
FIG. 14 illustrates aggregated CSI-RS resource configuration in accordance with a first exemplary embodiment of the disclosure.

In addition to increasing CSI-RS transmission efficiency by varying the number of antenna ports mapping overcome, the CSI-RS transmission may also be aggregated. As previously described in FIG. 1G that in one physical resource block (PRB), only 40 resource elements could be available for CSI-RS transmission. However, a base station or eNB may be able to configure multiple legacy CSI-RS resources, designed for 2, 4 or 8 ports for example, and aggregate the legacy CSI-RS resources to allow measurements for more than 8 ports. FIG. 14 illustrates aggregated CSI-RS resource configuration in accordance with a first exemplary embodiment of the disclosure. In this exemplary embodiment, a base station may configure one 8-port CSI-RS resource 1401 and one 4-port CSI-RS resource 1402 to be aggregated to form a 12-ports CSI-RS.

Figure 15:
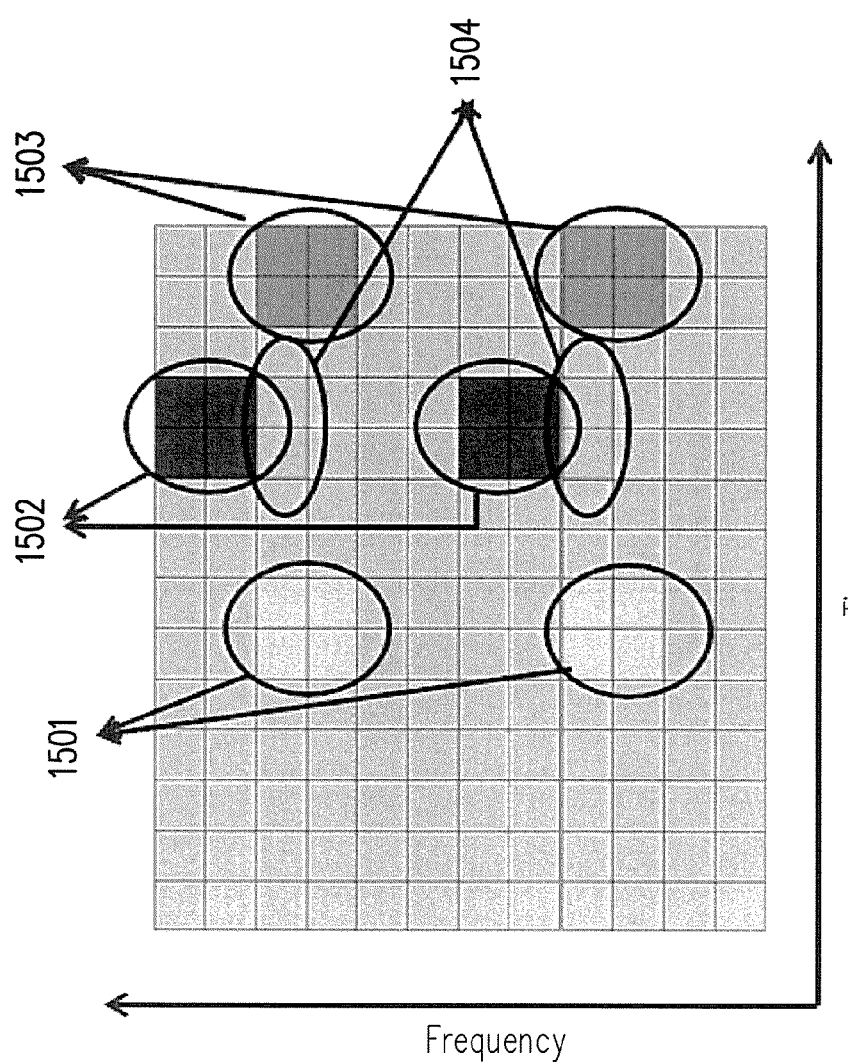
FIG. 15 illustrates aggregated CSI-RS resource configuration in accordance with a second embodiments of the disclosure.

FIG. 15 illustrates aggregated CSI-RS resource configuration in accordance with a second embodiments of the disclosure. In this exemplary embodiment, the eNB may first configure M legacy CSI-RS resources and then signal an indication to notify the UE as for which of the M configured CSI-RS resources are activated and aggregated for CSI-RS transmission. For instance, an eNB may configure 4 CSI-RS resources which include an 8-port CSI-RS 1501, an 8-port CSI-RS 1502, an 8-port CSI-RS 1503, and a 4-port CSI-RS. Next, the eNB may select, for example, 2 of the configured CSI-RS resources. In this example, the 8-port CSI-RS 1501 and the 8-port CSI-RS 1503 could be aggregated to be mapped to 16 CSI-RS ports. Subsequently, the eNB may send an indication to the UE to indicate to the UE that a plurality of legacy CSI-RS resources have been aggregated. Also, the eNB would inform which of the 2 legacy CSI-RS resources have been aggregated.

Figure 16A:
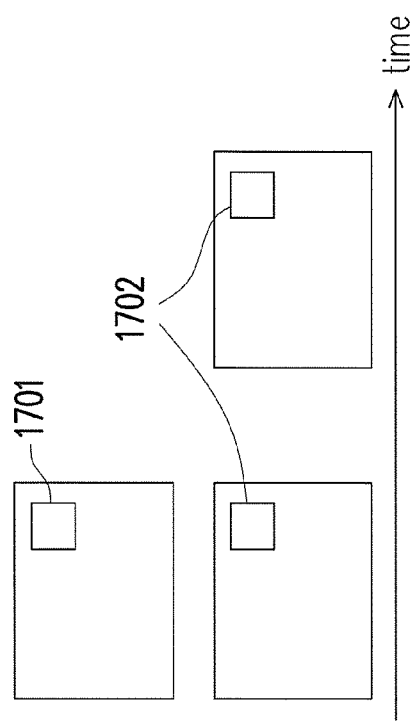
FIG. 16A illustrates cross-subframe aggregation of CSI-RS resources in accordance with one of the exemplary embodiments of the disclosure.
Figure 16B:
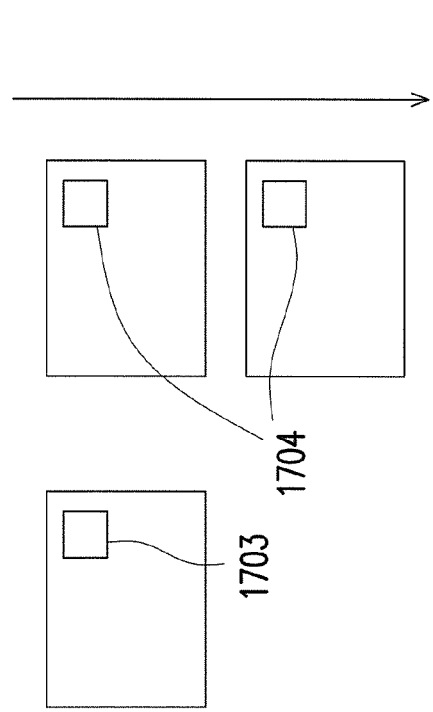
FIG. 16B illustrates cross-PRB aggregation of CSI-RS resources in accordance with one of the exemplary embodiments of the disclosure.

The above mentioned CSI-RS aggregation could also be implemented as cross-subframe aggregation as well as cross-PRB aggregation. FIG. 16A illustrates cross-subframe aggregation of CSI-RS resources in accordance with one of the exemplary embodiments of the disclosure. For the exemplary embodiment of FIG. 16A, one CSI-RS resource 1701 is configured. If bounding factor is 2, the same CSI-RS resource in two different subframes 1702 could be aggregated for CSI-measurement. FIG. 16B illustrates cross-PRB aggregation of CSI-RS resources in accordance with one of the exemplary embodiments of the disclosure. For the exemplary embodiment of FIG. 16B, one CSI-RS resource 1703 is configured. If bounding factor is 2, the same CSI-RS resource in two different PRBs 1704 could be aggregated for CSI-measurement.

In view of the aforementioned descriptions, the present disclosure is suitable for being used in a MIMO wireless communication system and is able to improve both performances and efficiencies of both precoded and nonprecoded CSI-RS transmission and reception of wireless devices.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of transmitting channel state information reference signal (CSI-RS) applicable to a base station, the method comprising:
   configuring a first resource block for M CSI-RS port(s), wherein M is an integer greater than zero;
   configuring a second resource block of N CSI-RS port(s), wherein N is an integer greater than zero;
   combining the first resource block and the second resource block to aggregate M+N CSI-RS ports for a CSI-RS transmission, wherein in response to configuring the first resource block for M CSI-RS port(s), the same first resource block of a different physical resource block is aggregated for the CSI-RS transmission;
   mapping a CSI-RS into a plurality of beams which comprises a first beam group and a second beam group, wherein each of a first plurality of beams of the first beam group is transmitted toward a different direction from each of a second plurality of beams of the second beam group; transmitting the first beam group and the second beam group; and receiving a channel state information (CSI) which correspond to a beam of the first beam group or a beam of the second beam group.

2. The method of claim 1, wherein the first beam group is transmitted in a different time slot from the second beam group.

3. The method of claim 1, wherein the first beam group is transmitted in a different frequency spectrum from the second beam group.

4. The method of claim 3, wherein the first beam group is either orthogonal from the second beam group or is allocated in an adjacent frequency from the second beam group.

5. The method of claim 1, wherein the first beam group is transmitted in a different time slot from the second beam group and also is transmitted in a different frequency spectrum from the second beam group.

6. The method of claim 1 further comprising: transmitting a quantity of antenna port (L) which indicates a quantity of the first plurality of beams or a quantity of the second plurality of beams.

7. The method of claim 6 further comprising: transmitting a value of oversampling factor (Q) which indicates a quantity of beam groups within a plurality of beams.

8. The method of claim 1, wherein receiving the channel state in formation (CSI) further comprises receiving a bitmap or beam index (BI) indicating a beam selection information.

9. The method of claim 8, wherein receiving the channel state information (CSI) further comprises receiving a beam group index indicating a beam group selection information.

10. The method of claim 1 further comprising: mapping all antenna ports for CSI-RS transmission for a first predetermined period; and mapping a first portion of all antenna ports for CSI-RS transmission for a second predetermined period which is right after the first predetermined period.

11. The method of claim 10 further comprising: mapping a second portion of all antenna ports for CSI-RS transmission for a third predetermined period which is between the first predetermined period and the second predetermined period, wherein the second predetermined period is less than the first predetermined period, and the third predetermined period is less than the second predetermined period.

12. The method of claim 1 further comprising: mapping a portion all antenna ports for CSI-RS transmission; transmitting a Full-port mapping trigger; and mapping all antenna ports for CSI-RS transmission in response to transmitting the Full-port mapping trigger.

13. The method of claim 1 further comprising: transmitting a configuration message which indicates that the M CSI-RS port(s) and the N CSI-RS port(s) are aggregated for transmission and physical locations of the M+N CSI-RS ports.

14. The method of claim 1, further comprising: selecting a plurality of antenna ports for transmitting data in response to receiving the CSI; and transmitting the data through the plurality of antenna ports.

15. A base station comprising:
   a transmitter;
   a receiver;
   a processor coupled to the transmitter and the receiver and is configured at least for:
   configuring a first resource block for M CSI-RS port(s), wherein M is an integer greater than zero:
   configuring a second resource block of N CSI-RS port(s), wherein N is an integer greater than zero;

combining the first resource block and the second resource block to aggregate M+N CSI-RS ports for a CSI-RS transmission, wherein in response to configuring the first resource block for M CSI-RS port(s), the same first resource block of a different physical resource block is aggregated for the CSI-RS transmission; mapping a CSI-RS into a plurality of beams which comprises a first beam group and a second beam group, wherein each of a first plurality of beams of the first beam group is transmitted toward a different direction from each of a second plurality of beams of the second beam group;

transmitting, via the transmitter, the first beam group and the second beam group; and receiving, via the receiver, a channel state information (CSI) which correspond to a beam of the first beam group or a beam of the second beam group.

16. The base station of claim 15, wherein the processor is further configured for: selecting a plurality of antenna ports for transmitting data in response to receiving the CSI; and transmitting, via the transmitter, the data through the plurality of antenna ports.

17. A method of receiving a channel state information reference signal (CSI-RS) applicable to a user equipment, the method comprising:

receiving an indication which a same first resource block of a different physical resource block is aggregated for a CSI-RS transmission;

wherein the CSI-RS transmission is configured by combining a first resource block for M CSI-RS port(s) and a second resource block for N CSI-RS port(s) to aggregate M+N CSI-RS ports;

wherein the M and N are integers greater than zero;

receiving a beam of a first beam group which is a part of a plurality of beams comprising a first beam group and a second beam group, wherein each of a first plurality of beams of the first beam group is transmitted toward a different direction from each of a second plurality of beams of the second beam group;

selecting the beam of the first beam group;

performing a channel state information (CSI) measurement based on a CSI-RS that corresponds to the beam of the first beam group; and transmitting the CSI measurement and a beam selection information which corresponds to the beam of the first beam group.

18. The method of claim 17 further comprising: receiving a quantity of antenna port (L) which indicates a quantity of the first plurality of beams or a quantity of the second plurality of beams.

19. The method of claim 18 further comprising: receiving a value of oversampling factor (Q) which indicates a quantity of beam groups within a plurality of beams.

20. The method of claim 17, wherein transmitting the CSI measurement further comprises transmitting a bitmap or beam index (BI) indicating a beam selection information.

21. The method of claim 20, wherein transmitting the CSI measurement further comprises transmitting a beam group index indicating a beam group selection information.

22. A user equipment (UE) comprising: a transmitter; a receiver; and a processor coupled to the transmitter and the receiver and is configured at least for:

receiving an indication which a same first resource block of a different physical resource block is aggregated for a CSI-RS transmission;

wherein the CSI-RS transmission is configured by combining a first resource block for M CSI-RS port(s) and a second resource block for N CSI-RS port(s) to aggregate M+N CSI-RS ports;

wherein the M and N are integers greater than zero;

receiving a beam of a first beam group which is a part of a plurality of beams comprising a first beam group and a second beam group, wherein each of a first plurality of beams of the first beam group is transmitted toward a different direction from each of a second plurality of beams of the second beam group;

selecting the beam of the first beam group;

performing a channel state information (CSI) measurement based on a CSI-RS that corresponds to the beam of the first beam group; and transmitting the CSI measurement and a beam selection information which corresponds to the beam of the first beam group.

* * * * *